US009681108B2

(12) United States Patent
Holland et al.

(10) Patent No.: US 9,681,108 B2
(45) Date of Patent: *Jun. 13, 2017

(54) OCCUPANCY SENSOR AND ASSOCIATED METHODS

(75) Inventors: Eric Holland, Indian Harbour Beach, FL (US); Julia Sharon Irvin, Melbourne, FL (US); Eric Thosteson, Satellite Beach, FL (US); Benjamin Charles Burns, Satellite Beach, FL (US); John Beck, Satellite Beach, FL (US)

(73) Assignee: Lighting Science Group Corporation, Melbourne, FL (US)

( * ) Notice: Subject to any disclaimer, the term of this patent is extended or adjusted under 35 U.S.C. 154(b) by 805 days.

This patent is subject to a terminal disclaimer.

(21) Appl. No.: 13/464,345

(22) Filed: May 4, 2012

(65) Prior Publication Data
US 2012/0287245 A1 Nov. 15, 2012

Related U.S. Application Data

(60) Provisional application No. 61/486,316, filed on May 15, 2011.

(51) Int. Cl.
*H04N 13/02* (2006.01)
*H04N 7/18* (2006.01)
(Continued)

(52) U.S. Cl.
CPC ............. *H04N 7/188* (2013.01); *G06T 7/254* (2017.01); *G08B 13/19602* (2013.01);
(Continued)

(58) Field of Classification Search
CPC ............ H04N 7/188; H04N 2013/0081; G06T 7/254; G06T 7/2053; G06T 2207/10016;
(Continued)

(56) References Cited

U.S. PATENT DOCUMENTS 4,551,654 A 11/1985 Barnum et al.
4,942,384 A 7/1990 Yamauchi et al.
(Continued)

FOREIGN PATENT DOCUMENTS

WO WO 02/16824 2/2002
WO WO 2006/095315 9/2006
(Continued)

OTHER PUBLICATIONS

US 4,970,436, 11/1990, Sacchetti (withdrawn)
US 4,992,701, 02/1991, Sacchetti (withdrawn)
U.S. Appl. No. 13/463,020, filed May 3, 2012, Holland et al.
U.S. Appl. No. 13/464,292, filed May 4, 2012, Holland et al.
U.S. Appl. No. 13/464,345, filed May 4, 2012, Holland et al.
Tannith Cattermole, "Smart Energy Glass controls light on demand", Gizmag.com, Apr. 18, 2010, accessed Nov. 1, 2011.
(Continued)

*Primary Examiner* — Joseph Ustaris
*Assistant Examiner* — Jill Sechser
(74) *Attorney, Agent, or Firm* — Mark Malek; Kelly G. Swartz; Widerman Malek, PL

(57) ABSTRACT

A device to detect occupancy of an environment includes a sensor to capture video frames from a location in the environment. The device may compare rules with data using a rules engine. The microcontroller may include a processor and memory to produce results indicative of a condition of the environment. The device may also include an interface through which the data is accessible. The device may generate results respective to the location in the environment. The microcontroller may be in communication with a network. The video frames may be concatenated to create an overview to display the video frames substantially seamlessly respective to the location in which the sensor is positioned. The overview may be viewable using the interface and the results of the analysis performed by the rules engine may be accessible using the interface.

56 Claims, 9 Drawing Sheets

(51) Int. Cl.
 *G08B 13/196* (2006.01)
 *G06T 7/254* (2017.01)
 *H04N 13/00* (2006.01)
(52) U.S. Cl.
 CPC ............... *G06T 2207/10016* (2013.01); *G06T 2207/20224* (2013.01); *G06T 2207/30232* (2013.01); *H04N 2013/0081* (2013.01)
(58) Field of Classification Search
 CPC  G06T 2207/20224; G06T 2207/30232; G08B 13/19602
 USPC .......................................................... 348/46
 See application file for complete search history.

(56) References Cited

U.S. PATENT DOCUMENTS

| | | | |
|---|---|---|---|
| 5,319,301 A | 6/1994 | Callahan et al. | |
| 5,523,878 A | 6/1996 | Wallace et al. | |
| 5,563,422 A | 10/1996 | Nakamura et al. | |
| 5,747,976 A | 5/1998 | Wong et al. | |
| 5,936,599 A | 8/1999 | Reymond et al. | |
| 5,997,150 A | 12/1999 | Anderson | |
| 6,140,646 A | 10/2000 | Busta et al. | |
| 6,211,626 B1 | 4/2001 | Lys et al. | |
| 6,272,154 B1 | 8/2001 | Bala et al. | |
| 6,341,876 B1 | 1/2002 | Moss et al. | |
| 6,356,700 B1 | 3/2002 | Strobl | |
| 6,561,656 B1 | 5/2003 | Kojima et al. | |
| 6,594,090 B2 | 7/2003 | Kruschwitz et al. | |
| 6,733,135 B2 | 5/2004 | Dho | |
| 6,767,111 B1 | 7/2004 | Lai | |
| 6,817,735 B2 | 11/2004 | Shimizu et al. | |
| 6,825,761 B2 | 11/2004 | Christ et al. | |
| 6,853,150 B2 | 2/2005 | Clauberg et al. | |
| 6,870,523 B1 | 3/2005 | Ben-David et al. | |
| 6,871,982 B2 | 3/2005 | Holman et al. | |
| 6,876,007 B2 | 4/2005 | Yamazaki et al. | |
| 6,967,761 B2 | 11/2005 | Starkweather et al. | |
| 6,974,713 B2 | 12/2005 | Patel et al. | |
| 7,042,623 B1 | 5/2006 | Huibers et al. | |
| 7,066,628 B2 | 6/2006 | Allen | |
| 7,070,281 B2 | 7/2006 | Kato | |
| 7,072,096 B2 | 7/2006 | Holman et al. | |
| 7,075,707 B1 | 7/2006 | Rapaport et al. | |
| 7,083,304 B2 | 8/2006 | Rhoads et al. | |
| 7,138,770 B2 | 11/2006 | Uang et al. | |
| 7,178,941 B2 | 2/2007 | Roberge et al. | |
| 7,184,201 B2 | 2/2007 | Duncan | |
| 7,246,923 B2 | 7/2007 | Conner | |
| 7,255,469 B2 | 8/2007 | Wheatley et al. | |
| 7,261,453 B2 | 8/2007 | Morejon et al. | |
| 7,289,090 B2 | 10/2007 | Morgan | |
| 7,300,177 B2 | 11/2007 | Conner | |
| 7,303,291 B2 | 12/2007 | Ikeda et al. | |
| 7,325,956 B2 | 2/2008 | Morejon et al. | |
| 7,342,658 B2 | 3/2008 | Kowarz et al. | |
| 7,344,279 B2 | 3/2008 | Mueller et al. | |
| 7,349,095 B2 | 3/2008 | Kurosaki | |
| 7,400,439 B2 | 7/2008 | Holman | |
| 7,427,146 B2 | 9/2008 | Conner | |
| 7,429,983 B2 | 9/2008 | Islam | |
| 7,434,946 B2 | 10/2008 | Huibers | |
| 7,438,443 B2 | 10/2008 | Tatsuno et al. | |
| 7,476,016 B2 | 1/2009 | Kurihara | |
| 7,489,086 B2 | 2/2009 | Miskin et al. | |
| 7,520,642 B2 | 4/2009 | Holman et al. | |
| 7,530,708 B2 | 5/2009 | Park | |
| 7,537,347 B2 | 5/2009 | Dewald | |
| 7,540,616 B2 | 6/2009 | Conner | |
| 7,567,040 B2 | 7/2009 | Pong et al. | |
| 7,598,682 B2 | 10/2009 | Grajcar | |
| 7,598,686 B2 | 10/2009 | Lys et al. | |
| 7,604,378 B2 | 10/2009 | Wolf et al. | |
| 7,605,971 B2 | 10/2009 | Ishii et al. | |
| 7,607,798 B2 | 10/2009 | Panotopoulos | |
| 7,626,755 B2 | 12/2009 | Furuya et al. | |
| 7,677,736 B2 | 3/2010 | Kasazumi et al. | |
| 7,684,007 B2 | 3/2010 | Hull et al. | |
| 7,703,943 B2 | 4/2010 | Li et al. | |
| 7,708,452 B2 | 5/2010 | Maxik et al. | |
| 7,709,811 B2 | 5/2010 | Conner | |
| 7,719,766 B2 | 5/2010 | Grasser et al. | |
| 7,728,846 B2 | 6/2010 | Higgins | |
| 7,732,825 B2 | 6/2010 | Kim et al. | |
| 7,766,490 B2 | 8/2010 | Harbers et al. | |
| 7,819,556 B2 | 10/2010 | Heffington et al. | |
| 7,828,453 B2 | 11/2010 | Tran et al. | |
| 7,828,465 B2 | 11/2010 | Roberge et al. | |
| 7,832,878 B2 | 11/2010 | Brukilacchio et al. | |
| 7,834,867 B2 | 11/2010 | Sprague et al. | |
| 7,835,056 B2 | 11/2010 | Doucet et al. | |
| 7,841,714 B2 | 11/2010 | Gruber | |
| 7,845,823 B2 | 12/2010 | Mueller et al. | |
| 7,852,017 B1 | 12/2010 | Melanson | |
| 7,871,839 B2 | 1/2011 | Lee et al. | |
| 7,880,400 B2 | 2/2011 | Zhou et al. | |
| 7,889,430 B2 | 2/2011 | El-Ghoroury et al. | |
| 7,902,769 B2 | 3/2011 | Shteynberg et al. | |
| 7,906,789 B2 | 3/2011 | Jung et al. | |
| 7,928,565 B2 | 4/2011 | Brunschwiler et al. | |
| 7,972,030 B2 | 7/2011 | Li | |
| 7,976,205 B2 | 7/2011 | Grotsch et al. | |
| 8,016,443 B2 | 9/2011 | Falicoff et al. | |
| 8,022,634 B2 | 9/2011 | Greenfeld et al. | |
| 8,040,070 B2 | 10/2011 | Myers et al. | |
| 8,047,660 B2 | 11/2011 | Penn et al. | |
| 8,049,763 B2 | 11/2011 | Kwak et al. | |
| 8,061,857 B2 | 11/2011 | Liu et al. | |
| 8,070,302 B2 | 12/2011 | Hatanaka et al. | |
| 8,076,680 B2 | 12/2011 | Lee et al. | |
| 8,096,668 B2 | 1/2012 | Abu-Ageel | |
| 8,115,419 B2 | 2/2012 | Given et al. | |
| 8,188,687 B2 | 5/2012 | Lee et al. | |
| 8,212,494 B2 | 7/2012 | Veltman et al. | |
| 8,214,084 B2 | 7/2012 | Ivey et al. | |
| 8,232,745 B2 † | 7/2012 | Chemel | |
| 8,674,608 B2 | 3/2014 | Holland et al. | |
| 8,680,457 B2 | 3/2014 | Maxik et al. | |
| 8,686,641 B2 | 4/2014 | Maxik et al. | |
| 8,761,447 B2 | 6/2014 | Maxik et al. | |
| 8,818,202 B2 | 8/2014 | Maxik et al. | |
| 9,024,536 B2 | 5/2015 | Maxik et al. | |
| 2002/0148944 A1 | 10/2002 | Tatum et al. | |
| 2004/0052076 A1 | 3/2004 | Mueller et al. | |
| 2004/0240542 A1* | 12/2004 | Yeredor ............ G06K 9/00771 375/240.01 |
| 2006/0002108 A1 | 1/2006 | Ouderkirk et al. | |
| 2006/0002110 A1 | 1/2006 | Dowling et al. | |
| 2006/0164005 A1 | 7/2006 | Sun | |
| 2006/0164607 A1 | 7/2006 | Morejon et al. | |
| 2006/0232992 A1 | 10/2006 | Bertram et al. | |
| 2006/0238383 A1 | 10/2006 | Kimchi et al. | |
| 2006/0285193 A1 | 12/2006 | Kimura et al. | |
| 2007/0013871 A1 | 1/2007 | Marshall et al. | |
| 2007/0159492 A1 | 7/2007 | Lo et al. | |
| 2007/0188847 A1 | 8/2007 | McDonald et al. | |
| 2007/0241340 A1 | 10/2007 | Pan | |
| 2007/0273765 A1* | 11/2007 | Wang et al. ................... 348/152 |
| 2007/0279494 A1* | 12/2007 | Aman et al. ................... 348/169 |
| 2007/0285510 A1* | 12/2007 | Lipton et al. ................. 348/135 |
| 2008/0136628 A1* | 6/2008 | Ishii ............................... 340/540 |
| 2008/0143973 A1 | 6/2008 | Wu | |
| 2008/0198572 A1 | 8/2008 | Medendorp | |
| 2008/0232084 A1 | 9/2008 | Kon | |
| 2008/0258643 A1 | 10/2008 | Cheng et al. | |
| 2009/0009102 A1 | 1/2009 | Kahlman et al. | |
| 2009/0059099 A1 | 3/2009 | Linkov et al. | |
| 2009/0059585 A1 | 3/2009 | Chen et al. | |
| 2009/0128781 A1 | 5/2009 | Li | |
| 2009/0160370 A1 | 6/2009 | Tai et al. | |
| 2009/0175041 A1 | 7/2009 | Yuen et al. | |
| 2009/0200952 A1 | 8/2009 | King et al. | |

(56) References Cited

U.S. PATENT DOCUMENTS

| | | | |
|---|---|---|---|
| 2009/0219387 A1* | 9/2009 | Marman | G08B 13/19652 348/143 |
| 2009/0261748 A1 | 10/2009 | McKinney et al. | |
| 2009/0262189 A1* | 10/2009 | Marman | 348/143 |
| 2009/0262516 A1 | 10/2009 | Li | |
| 2010/0006762 A1 | 1/2010 | Yoshida et al. | |
| 2010/0051976 A1 | 3/2010 | Rooymans | |
| 2010/0060181 A1 | 3/2010 | Choi et al. | |
| 2010/0061068 A1 | 3/2010 | Geissler et al. | |
| 2010/0061078 A1 | 3/2010 | Kim | |
| 2010/0072494 A1 | 3/2010 | Lee | |
| 2010/0103389 A1 | 4/2010 | McVea et al. | |
| 2010/0202129 A1 | 8/2010 | Abu-Ageel | |
| 2010/0213859 A1 | 8/2010 | Shteynberg et al. | |
| 2010/0231136 A1 | 9/2010 | Reisenauer et al. | |
| 2010/0231863 A1 | 9/2010 | Hikmet et al. | |
| 2010/0244700 A1 | 9/2010 | Chong et al. | |
| 2010/0244724 A1 | 9/2010 | Jacobs et al. | |
| 2010/0270942 A1 | 10/2010 | Hui et al. | |
| 2010/0277067 A1 | 11/2010 | Maxik et al. | |
| 2010/0277084 A1 | 11/2010 | Lee et al. | |
| 2010/0302464 A1 | 12/2010 | Raring et al. | |
| 2010/0308738 A1 | 12/2010 | Shteynberg et al. | |
| 2010/0308739 A1 | 12/2010 | Shteynberg et al. | |
| 2010/0315320 A1 | 12/2010 | Yoshida | |
| 2010/0320927 A1 | 12/2010 | Gray et al. | |
| 2010/0320928 A1 | 12/2010 | Kaihotsu et al. | |
| 2010/0321641 A1 | 12/2010 | Van Der Lubbe | |
| 2010/0321933 A1 | 12/2010 | Hatanaka et al. | |
| 2011/0012137 A1 | 1/2011 | Lin et al. | |
| 2011/0043806 A1 | 2/2011 | Guetta et al. | |
| 2011/0102588 A1 | 5/2011 | Trundle et al. | |
| 2011/0191158 A1 | 8/2011 | Kateraas et al. | |
| 2011/0248640 A1 | 10/2011 | Welten et al. | |
| 2011/0309759 A1 | 12/2011 | Shteynberg et al. | |
| 2012/0086568 A1 | 4/2012 | Scott et al. | |
| 2012/0287242 A1 | 11/2012 | Gilboa et al. | |
| 2012/0287271 A1 | 11/2012 | Holland et al. | |
| 2013/0201290 A1* | 8/2013 | Holland et al. | 348/46 |
| 2014/0015438 A1 | 1/2014 | Maxik et al. | |
| 2014/0192238 A1* | 7/2014 | Attar et al. | 348/252 |
| 2014/0296943 A1 | 10/2014 | Maxik et al. | |

FOREIGN PATENT DOCUMENTS

| | | |
|---|---|---|
| WO | WO 2007/125477 | 11/2007 |
| WO | WO 2010/027459 | 3/2010 |
| WO | WO 2010/098811 | 9/2010 |
| WO | WO 2011/008251 | 1/2011 |
| WO | WO 2011/016860 | 2/2011 |

OTHER PUBLICATIONS

International Search Report and Written Opinion for PCT/US2013/027226 dated Nov. 18, 2013.

U.S. Patent and Trademark Office's Office Action dated Sep. 15, 2015 for related U.S. Appl. No. 13/785,652, filed Mar. 5, 2013 (27 pages).

U.S. Patent and Trademark Office's Interview Summary dated Nov. 19, 2015 for related U.S. Appl. No. 13/785,652, filed Mar. 5, 2013 (3 pages).

U.S. Patent and Trademark Office's Office Action dated Mar. 19, 2015 for related U.S. Appl. No. 13/785,652, filed Mar. 5, 2013 (10 pages).

Holland et al., U.S. Appl. No. 61/486,314, filed May 15, 2011, (39 pages).

Soler et al., U.S. Appl. No. 61/923,924, filed Jan. 6, 2014, (35 pages).

Maxik et al., U.S. Appl. No. 61/924,435, filed Jan. 7, 2014, (12 pages).

Maxik et al., U.S. Appl. No. 61/948,185, filed Mar. 5, 2014, (30 pages).

U.S. Patent and Trademark Office's Office Action dated Jan. 12, 2016 for related U.S. Appl. No. 13/785,652, filed Mar. 5, 2013 (26 pages).

U.S. Patent and Trademark Office's Interview Summary dated Apr. 15, 2016 for related U.S. Appl. No. 13/785,652, filed Mar. 5, 2013 (3 pages).

U.S. Patent and Trademark Office's Office action dated Jul. 28, 2016 for related U.S. Appl. No. 13/785,652, filed Mar. 5, 2013 (29 pages).

Intelligent occupancy sensor, 2 pages, Lyrtech, Inc., Canada.†

Motion-based Obstacle Detection and Tracking for Car Driving Assistance, 4 pages, Aug. 2002, IAPR Int. Conf. on Pattern Recognition, Canada.†

Video and Vision Guide, 81 pages, 2009, Texas Instruments, Texas, US.†

Digital Image Processing, 3 pages, 2002, Prentice Hall, New Jersey, US.†

Lefaix, G. et al., Motion-based Obstacle Detection and Tracking for Car Driving Assistance, 4 pages, Aug. 2002, IAPR Int. Conf. on Pattern Recognition, Canada.†

Gonzalez, R. and Woods, Richard E., Digital Image Processing, 3 pages, 2002, Prentice Hall, New Jersey, US.†

Intelligent Occupancy Sensor, 2 pages, 2009, Lyrtech, Inc., Canada.†

\* cited by examiner
† cited by third party

OCCUPANCY SENSOR AND ASSOCIATED METHODS

RELATED APPLICATIONS

This application is related to U.S. patent application Ser. No. 13/464,292 filed simultaneously herewith and titled Intelligent Security Light and Associated Methods, the entire contents of which are incorporated herein by reference. This application is also related to U.S. patent application Ser. No. 13/403,531 filed Feb. 23, 2012 and titled Configurable Environmental Condition Sensing Luminaire, System and Associated Methods, the entire contents of which are incorporated herein by reference. This application also claims the benefit of U.S. Provisional Patent Application Ser. No. 61/486,316 filed on May 15, 2011 and titled Motion Detecting Security Light and Associated Methods, the entire contents of which are incorporated herein by reference.

FIELD OF THE INVENTION

The present invention relates to the field of lighting systems and, more specifically, to lighting systems that can detect changes in the environment, and associated methods.

BACKGROUND OF THE INVENTION

Security lighting systems are widely used for prevention of crime and vandalism in many communities, as well as to act as deterrents. These security systems are commonly used to monitor residential and business properties, particularly the areas encompassing entrances to buildings, during nighttime hours. Representative examples of these security lighting systems are disclosed in U.S. Pat. No. 4,551,654 to Barnum, U.S. Pat. No. 4,942,384 to Yamauchi et al., and U.S. Pat. Nos. 4,970,436 and 4,992,701, both to Sacchetti.

Conventional security lighting systems may employ a light capable of illuminating a given area, and a motion detector capable of operating the light. The motion detector typically utilizes ultrasound, infrared or some other suitable form of energy, and may sense and be activated by motion into the given protected area which is being monitored. Activation of the motion detector, in turn, operates the light in an on position to illuminate the protected area for a given period of time. However, one drawback of such systems is a failure to differentiate between an innocent moving object and a potentially harmful intruder, e.g., the passing of an animal through the protected area, as opposed to an intruder. Known lighting systems simply activate the light upon detection of motion.

Consequently, a need remains for the improvement in the design of a security lighting system.

SUMMARY OF THE INVENTION

With the above deficiencies in mind, the present invention advantageously provides a device and associated methods that detect occupancy of an environment based on an analysis of the environment. The present invention also advantageously allows for customization of a security system based on defined parameters that may be stored on a rules engine. The present invention further advantageously provides the capability to generate results of an analysis with respect to the likelihood of disparity between images that may be captured with a sensor. The present invention further advantageously provides the capability to concatenate images captured at a plurality of locations to create an overview. The present invention still further advantageously provides the capability for such an output to be readily stored in a memory.

These and other features and advantages according to the present invention are provided by a device and associated methods for detecting occupancy in the environment. The device may include a plurality of sensors to capture images from the environment. These images may be processed by a microcontroller, which may apply a set of rules to the images. An analysis may be performed which includes comparing images to detect a likelihood of disparity between images that may be captured by a sensor. The images, for example, may be video frames. The system may advantageously differentiate a minor change in the images, such as wind blowing tree leaves, a darkening image due to cloud cover, a brightening image from the rising sun, or the like from a major change such as the appearance of an object or the disappearance of an object.

Furthermore, the system may be able to further differentiate changes by specifically identifying the detected object, or by correlating the change in the frame to the current time or the location in the environment in which the change is detected. For example, the system may be able to recognize the appearance of a particular car in the image. The appearance of the car may, for example, be expected and, as such, the rules engine may not make a determination that the detection of the car indicates a likelihood of disparity. On the other hand, the appearance of a car that is not known, i.e., a car that may be stored in the memory, or that may not be defined within the rules engine, or, also for example, the appearance of a car that may only be expected after a certain time of day, may result in a detection of a likelihood of disparity if, again, for example, the car appears before that time. As a result of the analysis of the images, as sensed using the sensor, the processor may produce an output to indicate whether or not a likelihood of disparity was detected. This output may be a control signal for an audible alert, a visual alert, or the like.

Additionally, the images, such as video frames, that are captured at each of a plurality of locations may be concatenated to create an overview of the environment. This overview may be a graphical representation of the environment captured by the sensors. The overview may be viewed on an interface that may be physically located remotely from the sensors.

A device according to an embodiment of the present invention may be capable of detecting a condition in an environment and may include a sensor to capture a video frame from a location in the environment. The device may further include a microcontroller which may, in turn, further include a processor and memory. The sensor may be electrically connected to the microcontroller and the video frame may be transmitted to the microcontroller as data.

A rules engine may be stored in the memory, and the processor may compare the data to rules contained in the rules engine to detect a likelihood of disparity between video frames. The results of the analysis may be generated respective to the likelihood of disparity and the results may be stored in memory. An interface through which the output is accessible may also be provided. The video frames captured from a plurality of sensors may be concatenated to create an overview. The overview may display the video frames substantially seamlessly respective to the location in which the sensor is positioned and may be viewable using the interface. At least part of the rules engine may define an analysis of the data. This analysis may include the steps of capturing a subsequent video frame, capturing a precedent video frame, comparing the subsequent video frame and the precedent video frame to detect a likelihood of disparity, and generating the output of the analysis with respect to the likelihood of disparity.

The analysis of the data defined by at least part of the rules engine may also include the generating results respective to the location in the environment.

The microcontroller may be in communication with a network using a network interface, and the sensor may comprise a plurality of sensors that are adapted to intercommunicate with the microcontroller through the network. The network may be electrically connected to a centralized computing device that may analyze the data transmitted by the plurality of sensors. Each of the plurality of sensors may be positioned at locations throughout the environment in a uniform manner. The video frames may be captured by each of the plurality of sensors in the locations throughout the environment in an approximately uniform manner, and the video frames may be concatenated to create an overview that includes substantially all of the locations throughout the environment substantially seamlessly. The locations throughout the environment may be configured relating to an approximately grid based pattern.

The plurality of sensors may be positioned to capture the video frames using similar viewing angles relative to the environment, and the plurality of sensors may intercommunicate though the network using mesh networking. The sensor may include a camera.

A high likelihood of disparity detected in a location may be indicative of occupancy of the location and a low likelihood of disparity in the location may be indicative of no occupancy of the location.

An event may be definable in the rules to relate to a condition being detected in the environment. A condition in the environment may be motion. The event may be associable with an action, which may occur subsequent to detecting the event. The action may include generating an alert. The video frame may be compressible by the microcontroller. After the video frame has been compressed, it may be transmitted through the network. The sensor may capture a plurality of video frames which may, in turn, be concatenated to create a video feed. The video feed may be accessible using the interface. The results of the analysis performed by the rules engine may be included in the video feed.

The portion of the overview that may be viewable using the interface may be the field of view. A wide field of view may include substantially all locations and a narrow filed of view may include one location. The field of view may be scalable between the wide field of view and the narrow field of view.

Supplemental data may be viewable using the interface. The supplemental data may be included with the overview substantially seamlessly. Further, a condition in the environment may be detectable by at least two of the plurality of sensors to create a stereoscopic perspective. A parallax among the video frames in the stereoscopic perspective may be used to calculate depth in a three-dimensional space.

The sensor, microcontroller, and interface may be includable in a luminaire.

A method aspect of the present invention is for detecting occupancy of an environment. The method may include capturing a video frame from a location in the environment and transmitting the video frame to a microcontroller as data. The method may also include conducting an analysis of the data by comparing the data to rules contained on a rules engine stored in the memory to produce an output. The method may further include making the output accessible through an interface.

The step of conducting the analysis may include capturing a subsequent video frame, capturing a precedent video frame, comparing the subsequent video frame and the precedent video frame to detect a likelihood of disparity between the video frames, and generating the results of the analysis respective to the likelihood of disparity.

The video frames captured at each of the plurality of locations may be concatenated to create an overview. The video frames may be displayed substantially seamlessly respective to the location in which the sensors are positioned and the overview may be viewable using an interface. The results of the analysis may be included in the overview and accessed using the interface.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Figure 1:
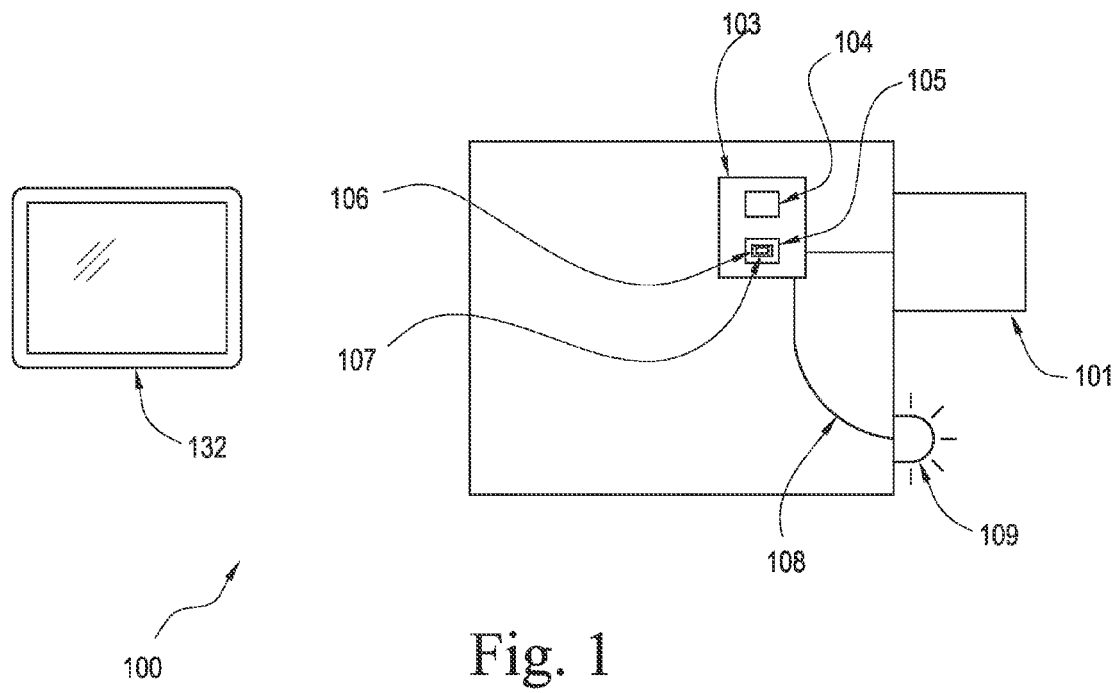
FIG. 1 is a schematic diagram of the lighting device according to an embodiment of the present invention.
Figure 1A:
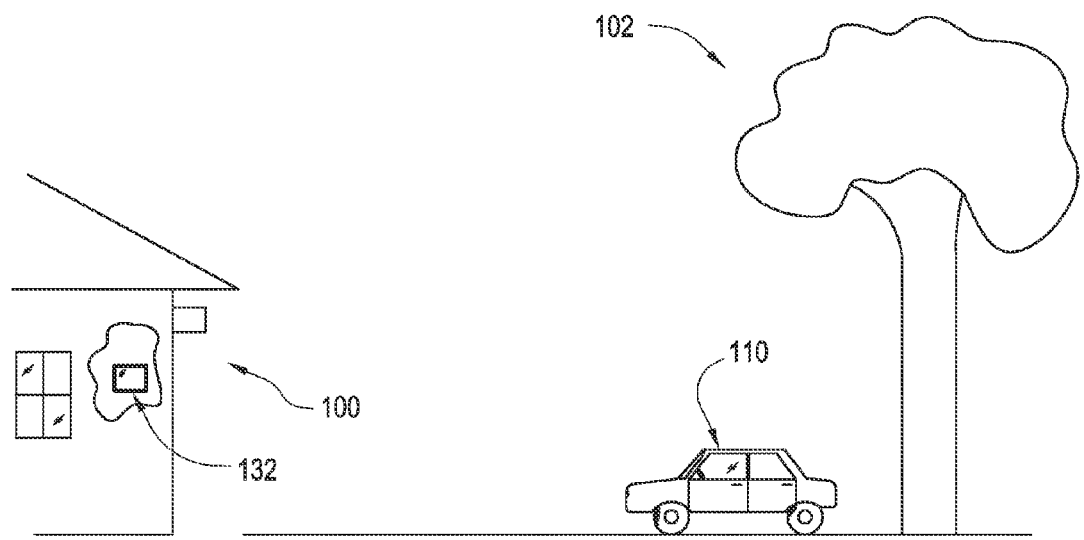
FIG. 1a is a partial environmental view of the lighting device according to an embodiment of the present invention.

Referring now to FIGS. 1-9, details of the lighting device 100 and associated methods according to an embodiment of the present invention are now described in greater detail. The terms lighting device and device are used interchangeably throughout this disclosure and one skilled in the art will realize that references to the device can be understood as references to the lighting device. Likewise, references to the lighting device can be understood as references to the device. The lighting device 100 according to an embodiment of the present invention is illustrated in FIG. 1. The lighting device may be capable of detecting a condition in an environment. In the embodiment shown in FIG. 1 the lighting device 100 may comprise a sensor 101. The sensor 101 may be anything capable of capturing information regarding characteristics of a location in the environment. Skilled artisans will appreciate possible embodiments of a sensor 101 include, for example, and without limitation, still cameras, video cameras, thermal imaging devices, motion detectors, ultrasound detectors, infrared light detectors, light emitting semiconductor devices or the like. Those of skill in the art will realize that these specific examples are discussed in the interest of clarity, and are not intended to limit the present invention to those examples.

The sensor 101 may capture information regarding characteristics of a location in the environment 102 at specified intervals of time. Characteristics of a location in the environment 102 that may be captured by the sensor 101 include, but are not limited to, the visual appearance of the environment, the heat distribution of the environment, relative location of objects in the environment, the motion of objects in the environment, the presence of an object occupying at least part of the environment, or the like. The sensor 101 may capture this information periodical or intermittently. Although the embodiment illustrated in FIG. 1 shows that the lighting device 100 includes one sensor 101, those skilled in the art will appreciate that any number of sensors may be provided to carry out the various features and advantages of the embodiments of the present invention. The device 100 may have a plurality of sensors 101 and these sensors 101 may be of different types. As an example, but not as a limitation, the device may include a plurality of video cameras and/or a plurality of infrared light detectors.

The information captured by the sensor 101 at each sampling interval may be referred to as an image or as images. Those skilled in the art will appreciate that the image or images that are captured by the sensor 101 may, for example, be a video frame, or video frames. The terms video frame and video frames may be used interchangeably throughout this disclosure. Those skilled in the art will further appreciate that the present invention contemplates that the sensor 101 may capture any type of image. In one embodiment, the sensor 101 may comprise a camera and the video frame may comprise the image captured by the camera at the sampling time. In another embodiment of the lighting device 100, the sensor 101 may comprise an infrared light detector and the video frame may comprise the output of the infrared light detector at the sampling time. The use of the term video frame is not intended to limit the sensor 101 to a device that collects visual data. Likewise, the use of the term video frame is not intended to limit the information gathered by the sensor 101 to visual data. Instead, it is to be understood by those skilled in the art that the information and data captured by the sensor 101 can be any type of information or data that is suitable for analysis.

The sensor 101 may capture characteristics of a location in the environment 102. The location in the environment 102 may be outside or inside. The location in the environment 102 may be any place of which the sensor 101 is capable of obtaining characteristics. The sensor 101 may remain immobile and capture characteristics of a location in the environment 102. Additionally, the sensor 101 may be mobile and capture characteristics of a location in the environment 102 where the environment detected by the sensor may change from video frame to video frame. The sensor 101 may move by way of joints that provide one or more degrees of freedom to the sensor 101. By utilizing movement in one or more direction, the sensor 101 may capture characteristics of different locations in the environment. By way of example, and not as a limitation, the sensor 101 may be connected to an apparatus that allows the sensor 101 to move in the horizontal axis and capture characteristics of a location in the environment 102. In this exemplary embodiment, each video frame captured by the sensor 101 may contain characteristics of a different location in the environment 102. One skilled in the art will appreciate that movement of the sensor 101 is not limited to movement in the horizontal axis. The sensor 101 may move in the vertical access, may adjust its yaw, may adjust its pitch, or the like. The lighting device may include a microcontroller 103. The microcontroller 103 may be any device that can send, receive, and analyze data and electronic signals. Those of skill in the art will realize that the microcontroller 103 may be a controller, gate array, system-on-a-chip, general purpose processing element, or collections of electronic components capable of processing data. Preferably, but without limitation, the microcontroller 103 may further include a processor (CPU) 104, memory 105, network interface that may be connected to a network, and/or an input/output (I/O) interface. Skilled artisans will appreciate that one or more of the aforementioned elements of the microcontroller 103 may be located outside of the microcontroller, or omitted from the microcontroller, as the embodiments of the present invention may vary. The sensor 101 may be electrically connected to the microcontroller 103. The video frame may be transmitted to the microcontroller 103 as data. The data may include information about the characteristics of a location in the environment 102. The data may include information about the visual appearance of a location in the environment 102, the heat distribution of a location in the environment 102, or the like. The data may be digital or analog information that can be processed and displayed as still or moving images. The processor 104 may analyze the data. The data may be analyzed by hardware, software, or a combination of both.

The microcontroller 103 may also include memory 105. The memory 105 may include volatile and/or non-volatile memory modules. Volatile memory modules may include random access memory, which may temporarily store data and code being accessed by the processor 104. The memory 105 may also store data captured by one or more of the sensors 101.

Additionally, the memory 105 may contain the computerized code used by the processor 104 to analyze the data. In an embodiment of the present invention, the memory 105 may include an operating system, which may additionally include applications to be run from within the operating system, as will be appreciated by a person of skill in the art.

The memory 105 may include information to be analyzed by the processor 104. This information may include data received from the sensors 101, modes of operation, and rules to govern the analysis of the aforementioned. The non-volatile memory may include flash based memory, which may store a computerized program to be executed by the processor 104. The memory 105 may store a rules engine 106 that is executed by the processor 104 to analyze the data. The rules engine 106 may be contained in hardware or software. In a preferred embodiment, the rules engine 106 may be a set of software instructions that are executed by the processor 104. A plurality of rules 107 may be contained in the rules engine 106. The rules engine 106 may compare the rules 107 with the data or may utilize the rules 107 to analyze the data. The processor 104 may compare the data to rules 107 contained in the rules engine 106 to produce an output 108. The rules 107 may be applied to the video frame, or to a plurality of video frames, to determine the output 108 of the microcontroller 103. At least part of the rules engine 106 may define the analysis of the data. Comparing the data to the rules 107 using the rules engine 106 may produce a result to indicate a condition of a location in the environment 102. The device 100 may indicate conditions of a location in the environment 102 such as, but not limited to, the presence of objects, the absence of objects, the motion of objects, the lack of motion of objects, and the like. The rules 107 may be included in memory 105 to define an operation to be performed on data, a comparison between various pieces of data, or otherwise define the operation of the various embodiments of the present invention. Preexisting rules 107 may be programmed into the memory 105. Additionally, rules 107 may be defined or modified by a user. The rules 107 may be defined or modified, for example, and without limitation, through an interface 132. The memory 105 may also store additional data used by a rules engine 106 to detect known objects 110, events, alerts, or the like.

The rules 107 stored on the rules engine 106 may, for example, be directed to any set of directions or requirements necessary for a particular operation to be carried out. More particularly, in order to carry out a particular operation using the lighting device 100, a particular condition of a location in the environment 102, or data, that is sensed by the sensor 101 may be compared against the rules 107. An operation of the lighting device 100 may be carried out depending on whether or not the particular condition of a location in the environment 102 or data is in compliance with the rules 107 on the rules engine 106.

The rules 107 may also be applied to the data transmitted by the sensor 101 to analyze the video frames and detect conditions in locations in the environment 102. More specifically, the rules 107 may be utilized to analyze the data and detect changes from on video frame to another. Additionally, the rules 107 may be applied to the video frames to determine whether detected changes are significant enough to warrant action by the device 100. As an example, but not as a limitation, the rules 107 may be utilized to determine if changes between two or more video frames indicate a material change to a condition in the location in the environment 102, such as, by way of example, and not as a limitation, the appearance of a person or the disappearance of a car. Likewise, the rules 107 may be utilized to determine if changes between two or more video frames indicate an immaterial change to a condition in the location in the environment 102, such as, by way of example, and not as a limitation, the movement of trees caused by the wind or the appearance of a small animal.

The rules 107 may be definable by a user, and may be added to or removed from the rules engine 106 by the user, and may also be modified by the user. In an embodiment of the device, the rules 107 may be definable using an interface 132. The user may access the interface 132 to directly input rules 107 regarding how the device 100 should respond to the detection of differing conditions of locations in the environment 102. The user may create, modify, or delete rules pertaining to what conditions should be considered material, how the device 100 should respond to the detection of different conditions, what objects should be classified as known objects 110, at what times alerts should be generated, what actions should be associated with events, what events should be associated with which objects, and the like. The sensor 101 may be utilized to capture video frames when defining the rules 107. As an example, but not as a limitation, an object may be placed in a location in the environment 102 from which the sensor 101 may capture video frames. The rules engine 106 may operate to detect or recognize the object placed in the location in the environment 102. The interface 132 may be utilized to create, modify, or delete a rule 107 related to the object placed in the location in the environment 102.

The lighting device may also include a light source 109. The light source 109 may be any device capable of emitting illumination. Examples of possible light sources 109 include incandescent light bulbs, fluorescent light bulbs, light emitting semiconductor devices, such as light emitting diodes (LEDs), or the like. The light source 109 may be operable responsive to the output of the microcontroller. The light source 109 may be electrically connected to and controlled by the microcontroller 103. The light source 109 may be actuated when certain objects or events are detected. The actuation of the light source 109 may be an action that is associated with an event. As an example, but not as a limitation, the rules engine 106 may analyze data received from the sensor 101 and detect a specific car that has been defined in the rules 107 as a known object 110. That known object 110 may be defined in the rules 107 to relate to an event. The event may be associated with the action of actuating the light source 109. The light source 109 may be actuated after the event is detected.

Known objects 110 may be identifiable by the lighting device. By way of example, but not as a means of limitation, a known object 110 may be identified in a video frame by applying a rule 107 to the data. When a known object 110 is identified, the rules engine 106 may take an action. The action taken by the rules engine 106 may include triggering an event, not triggering an event, or the like. Additionally, the rules engine 106 may take an action only if the known object 110 occurs at a specific time or during a specific time range. Conversely, the rules engine 106 may take an action only if the known object 110 occurs outside of a specific time or outside of a specific time range. Known objects 110 may be added or modified by the user. The known objects 110 may be defined in the rules 107 or may be stored in memory 105. Known objects 110 may be identified based upon a user's response to a previous output. Known objects 110 may be added to the device 100 by using the interface 132 or the sensor 101 or any combination of the two. As an example, but not as a limitation, an object may be placed in a location in the environment 102. The sensor 101 may capture a video frame that includes data related to the object. The rules engine 106 may operate on the data and a rule 107 may be created, modified, or deleted to define the object as a known object 110. Additionally, the device may be preprogrammed with a set of known objects 110. A known object 110 may be anything that may be detected by the device. Examples of known objects 110 may, for example, include cars, people, animals, or the like. Those skilled in the art will appreciate that the known object 110 may be defined to be any desired object, and is not meant to be limited to the examples provided above.

The rules 107 may define an action to be taken by the processor 104 in response to input data. In one embodiment, the rules 107 may be applied to the data received from the sensor 101 to determine an output 108 of the microcontroller 103. The rules 107 may perform an analysis of the data to detect such events as the appearance of objects, the disappearance of objects, the presence of a specific object, changes in lighting, expected events, the presence of known objects 110, or the like.

In one embodiment of the lighting device 100 according to the present invention, the output 108 may control or be displayed by an interface 132. The output 108 may be accessible through the interface 132. The results of the analysis performed by the rules engine may be accessed using the interface 132. The interface 132 may be a device that can be either on or off. In these embodiments, the interface 132 may be turned on when an event is detected and may be turned off when no event is detected. Similarly, the interface may also be turned off after an amount of time from when the event is detected, or may be operated between an on and an off state depending on the event that is detected. Examples of such interfaces 132 include light sources, audible alarms, or the like. In alternate embodiments of the device 100, the interface 132 may be a device that is capable of conveying detailed information to a user or receiving information from the user. Examples of such an interface 132 include a monitor, a computer, a cellular phone, a handheld device, a tablet, or the like. As an example, and not by way of limitation, the interface 132 may be a video monitor and an associated computer that display a visual representation of the data contained in the video frames and can collect input from the user.

The interface 132 may include a plurality of inputs, which may be manipulated by a user to define at least some of the rules. A person of skill in the art will appreciate that no inputs may be included in the interface 132 or as few as one input may be included in the interface 132 and be contemplated by the scope of this disclosure. Similarly, a skilled artisan will appreciate that the maximum number of inputs may be virtually limitless.

The interface 132 may also receive data. Examples of, but not limitations on, possible implementations of an interface 132 include a computer, cellular phone, tablet, handheld device, Internet connection, or the like. The user may interact with a graphical user interface (GUI) that transmits user information to the interface 132 or the GUI may be part of the interface 132. The information supplied through the interface 132 may define, at least in part, the rules.

With relation to the embodiments of the present invention, an input may be defined as an element of the interface 132 through which the operation of the lighting device 100 may be modified. As will be discussed in greater detail herein, the input may be provided by any number of means such as, for example, a mechanical toggle, a capacitive sensor, a keyboard, a touchscreen, or any other system, device or apparatus suitable to cause the transmission of a signal to the microcontroller 103. In one embodiment, the input may be a mechanical toggle, which may be physically engaged and mechanically altered to change the state of the toggle. For example, the mechanical toggle inputs may be a switch that open or close an electrical circuit upon being manipulated.

In another example, an input may be a capacitive sensor. The state of a capacitive sensor input may be altered upon the detection of an object located in proximity of the capacitive sensor. Skilled artisans will appreciate that a capacitive sensor may detect the proximity of an object using position, displacement, humidity, fluid level, acceleration, or other measurable changes in capacitance. An example of an object may include the finger of a user, without limitation.

In another example, the input may be user data received through a human interface device. By way of example, but not as a limitation, a human interface device may be a mouse, a keyboard, a touchscreen, or the like. A person of skill in the art will appreciate that any number of components capable of altering a signal may be included as an input, and should not limit the input to the examples discussed above. Additional inputs will be appreciated by a person of skill in the art. Further examples for the operation of the inputs will be provided below.

The inputs may be located on a surface of the device 100. Alternatively, the inputs may be operatively connected to the device 100, such that the inputs may be in communication with the microcontroller 103. In further embodiments, the inputs may be remotely connected to the device 100. Skilled artisans will appreciate that the aforementioned examples of connective structures are provided in the interest of clarity, and should not limit the present invention to the preceding examples.

Figure 2:
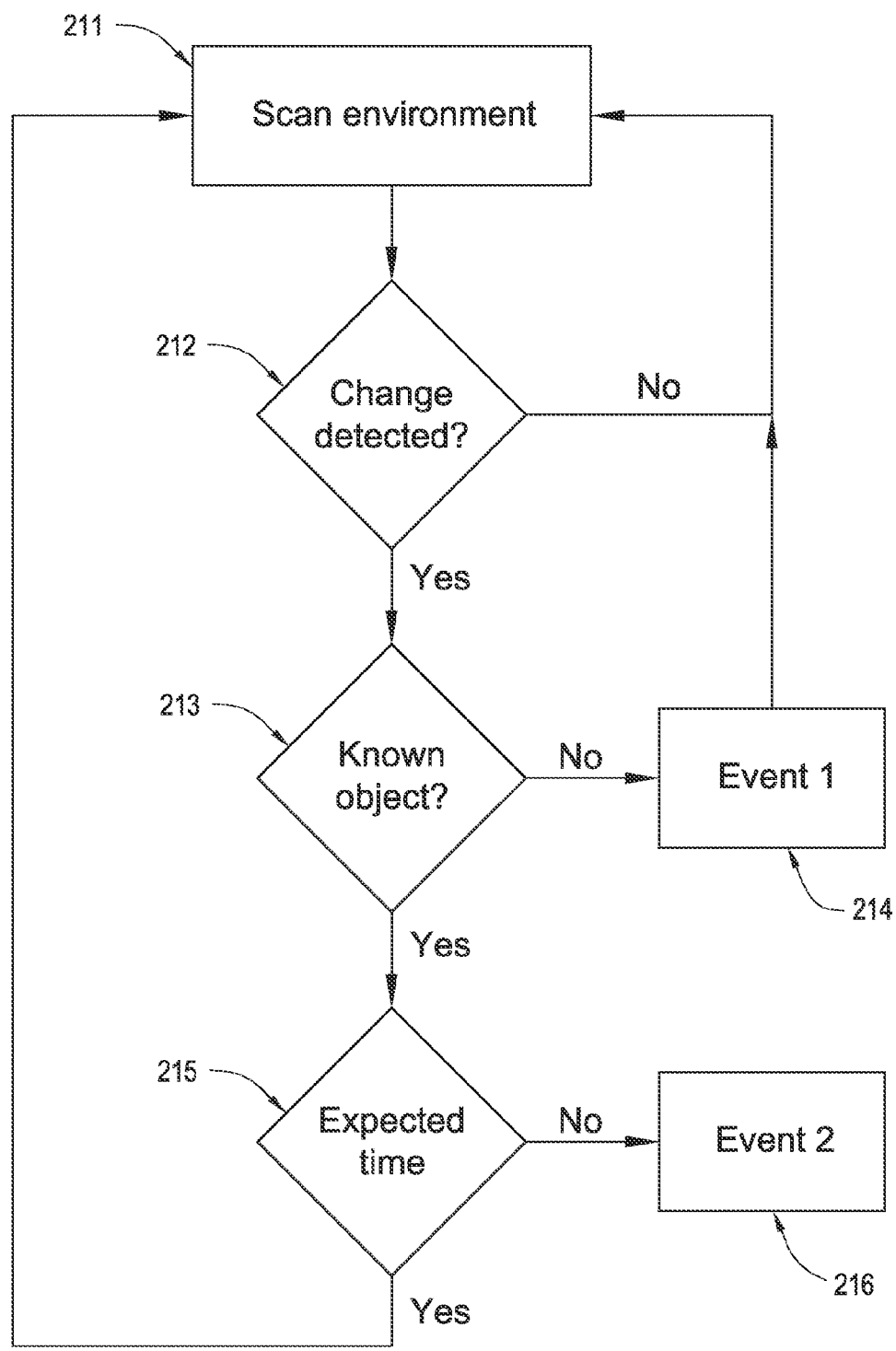
FIGS. 2-5 are flowcharts illustrating operation of the lighting device according to an embodiment of the present invention.

FIG. 2 illustrates rules that may be executed by the processor. The rules may define the analysis of the data. In the idle stage 211 the processor may scan the environment by analyzing video frames received from the sensor and apply rules to the video frames. The processor may then compare video frames to one another to determine if there has been a change in the environment 212. In the event that no change is detected, the processor may continue to scan the environment by analyzing video frames and applying rules to the video frames.

However, if there has been a change detected in the environment at 212, the processor may determine if a known object caused the change that is detected, and whether the change to the environment is the appearance or disappearance of a known object 213. If the change in the environment is not related to a known object, the processor may initiate an event 214. The event 214 may be enabling an output, disabling an output, executing a subroutine, or the like. After the event is initiated at 214, the device may continue to scan the environment at 211.

If the change in the environment is related to a known object, the processor may then determine whether this change has occurred at an expected time 215. If the change has not occurred at an expected time, the processor may initiate a second event 216. The second event 216 may be enabling an output, disabling an output, executing a subroutine, or the like. Those skilled in the art will appreciate that the second event 216 may be a different event than the first event 214, or may be the same event. Those skilled in the art will also appreciate that after the second event is initiated at 216, the device may continue to scan the environment at 211, or may end the process, or may take any number of other actions. If the change in the environment did occur at a known time, the processor may execute a third event (not shown) or, alternatively, may return to the idle stage 211. While not depicted in FIG. 2, those skilled in the art will recognize that in addition to determining whether the known object appeared or disappeared at an expected time, the processor is also capable of determining whether an unknown object appeared or disappeared, whether any object changed its position, whether any object is located in an expected position, or the like. These examples are not given as limitations, but merely meant to depict just some of the several advantages of the various embodiments of the present invention.

Figure 3:
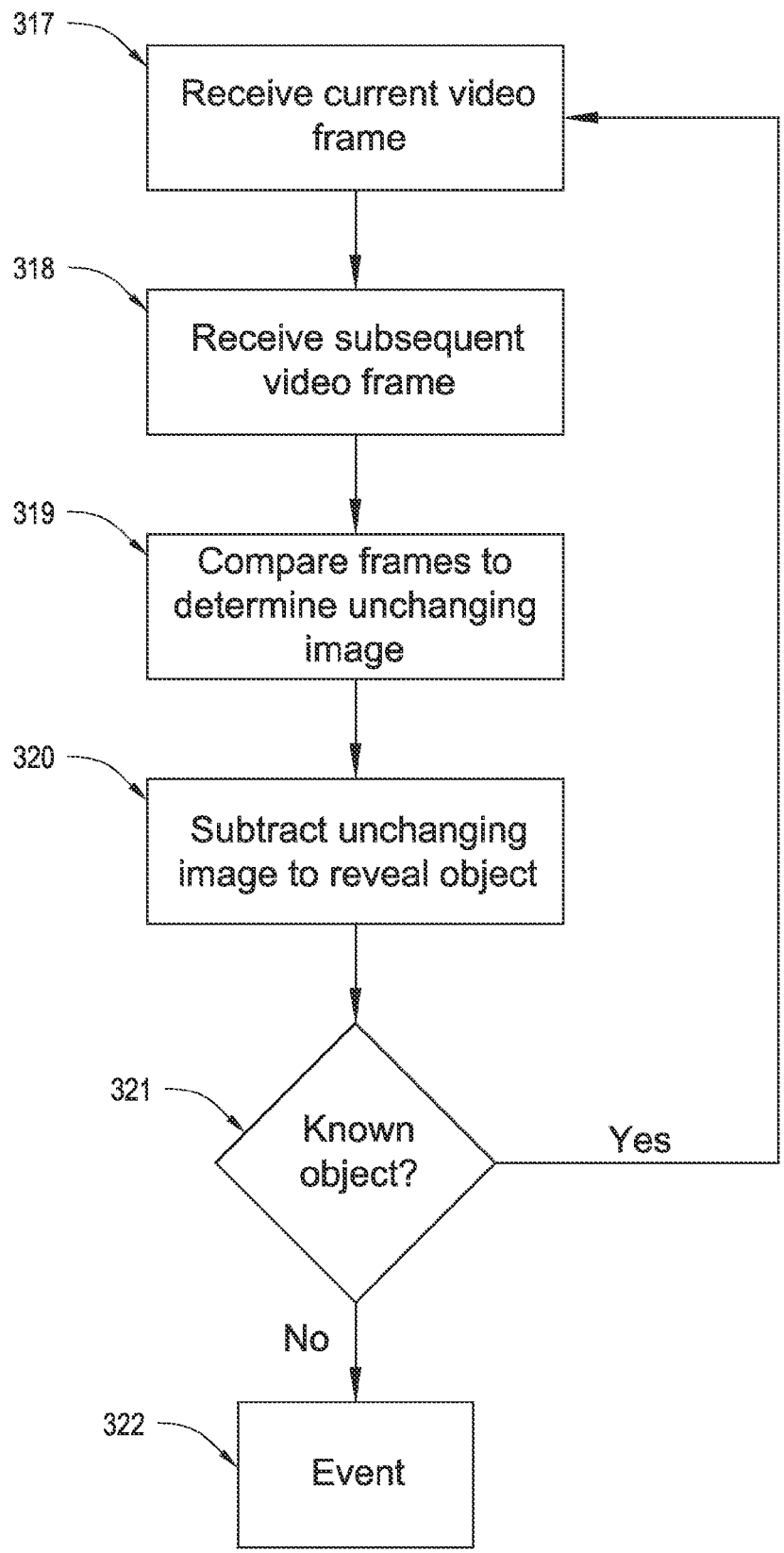

FIG. 3 depicts a possible set of rules for detecting a change in the environment. The rules engine may define an analysis of the data. In this embodiment of the invention, the data may be analyzed by comparing a current video frame to a subsequent video frame. Changes may also be detected by comparing a precedent video frame to a subsequent video frame. The terms precedent video frame and current video frame may be used interchangeable within this disclosure. The current video frame may be detected or captured by the sensor at time (t-0) at 317. The subsequent video frame may be detected or captured by the sensor at time (t-1) at 318. The rules may define comparing the current video frame and the subsequent video frame to detect a likelihood of disparity between the two video frames. The likelihood of disparity may be determined by analyzing the changes between the t-0 and t-1 video frames. The nature and quantity of the changes may determine the likelihood of disparity. For example, but not as a limitation, a subsequent video frame that is uniformly darker than the precedent video frame may be indicative of a low likelihood of disparity. The rules may detect the uniform darkening and attribute it to a change in lighting condition or some like environmental condition that does not create a high likelihood of disparity. Alternatively, analysis of the subsequent video frame may determine that a new object has appeared in the subsequent video frame. The rules may determine the likelihood of disparity in the instance based on the size, speed, color, shape, or other characteristic of the newly appeared object. One skilled in the art will appreciate that analysis of the video frames to determine the appearance of an object is given for exemplary purposes only and is not limiting. The analysis of the video frames may conclude that an object has disappeared, moved, remained stationary for an extended duration, or the like. The rules may define a result to be generated based on the analysis of the likelihood of disparity. The result of this analysis may be storable in memory. The result of the analysis may include setting a variable in software, actuating an indicator, performing a process, detecting an event, performing an action, or the like.

The rules may define comparing the current video frame and the subsequent video frame to a known object wherein the known object is stored in memory. The rules may further define generating the output with respect to a determination of whether the known object is detected in the subsequent video frame.

The results of the analysis of the precedent video frame and the subsequent video frame may be generated respective to the location in the environment. That is, the rules may take the specific location in the environment into account when determining the results of the analysis. As an example, and not as a limitation, the rules may determine a likelihood of disparity between the two video frames. The rules may then generate a result of the analysis that is dependent on the location in the environment from which the video frames were obtained. That is, identical analysis may produce differing results if the video frames are obtained from different locations in the environment. Additionally, the rules may consider time as a factor when generating the result. Identical analyses may produce different results if they are performed at different times.

As yet another example, but not by way of limitation, analysis of the two frames may indicate that there is a dramatic change in light levels with the subsequent frame being darker than the precedent frame. In an indoor location, this may create a result indicating that there is a high likelihood of disparity between the two frames because the lighting should remain constant. In an outdoor location, this may create a result indicating that there is a low likelihood of disparity between the two frames because decreases in lighting are expected outside as the sunsets. However, the rules may also account for the time of day at which the analysis is occurring. If the change in lighting occurs indoors at the end of the work day, the results may indicate that there is a low likelihood of disparity because it is expected that lights are turned off at this time. Similarly, if the change in lighting occurs outdoors at noon, the results may indicate that there is a high likelihood of disparity because it is unexpected that lighting will change dramatically when outside in the middle of the day.

Detecting changes in lighting levels is presented for exemplary purposes only and is not intended as a limitation. Those skilled in the art will recognize that an analysis of the two frames may result in a determination that an object has appeared, disappeared, moved, or the like. The likelihood of disparity may depend, in whole or in part, upon the object that is identified, the size of the object, the color of the object, the shape of the object, the time of day the object is detected, the elapsed time since the object was last identified, or the like.

The device may be utilized to determine occupancy of a location. A high likelihood of disparity detected in a location may be indicative of occupancy of the location. A low likelihood of disparity in the location may be indicative of no occupancy of the location.

One way in which the change between the current and subsequent video frame may be determined is by analyzing the current video frame and the subsequent video frame to detect what data is represented identically in both video frames at 319. The unchanging image may then be removed from the video frame to leave only the object at 320. The object may then be analyzed to determine whether it is a known object at 321. If the object is a known object, the rules may continue to execute. If the object is not a known object an event may occur at 322. The event may be associated with an action. For example, and not as a limitation, the sensor may continuously capture video frames from a location in the environment. If no condition in the location in the environment has changed, the device may simple continue to capture video frames from a location in the environment. If a condition in the location in the environment has changed, the changes may be analyzed by the rules to determine the response to the change. The rules may detect that the change identified in the video frames in the appearance of a known object. The appearance of that known object may be associated with an event that causes the device to simply continue collected video frames. In another embodiment, the appearance of that known object may be associated with an event that initiates an action. In one embodiment, that action may be actuating the light source. In another embodiment, that action may be actuating an audible alarm.

Figure 4:
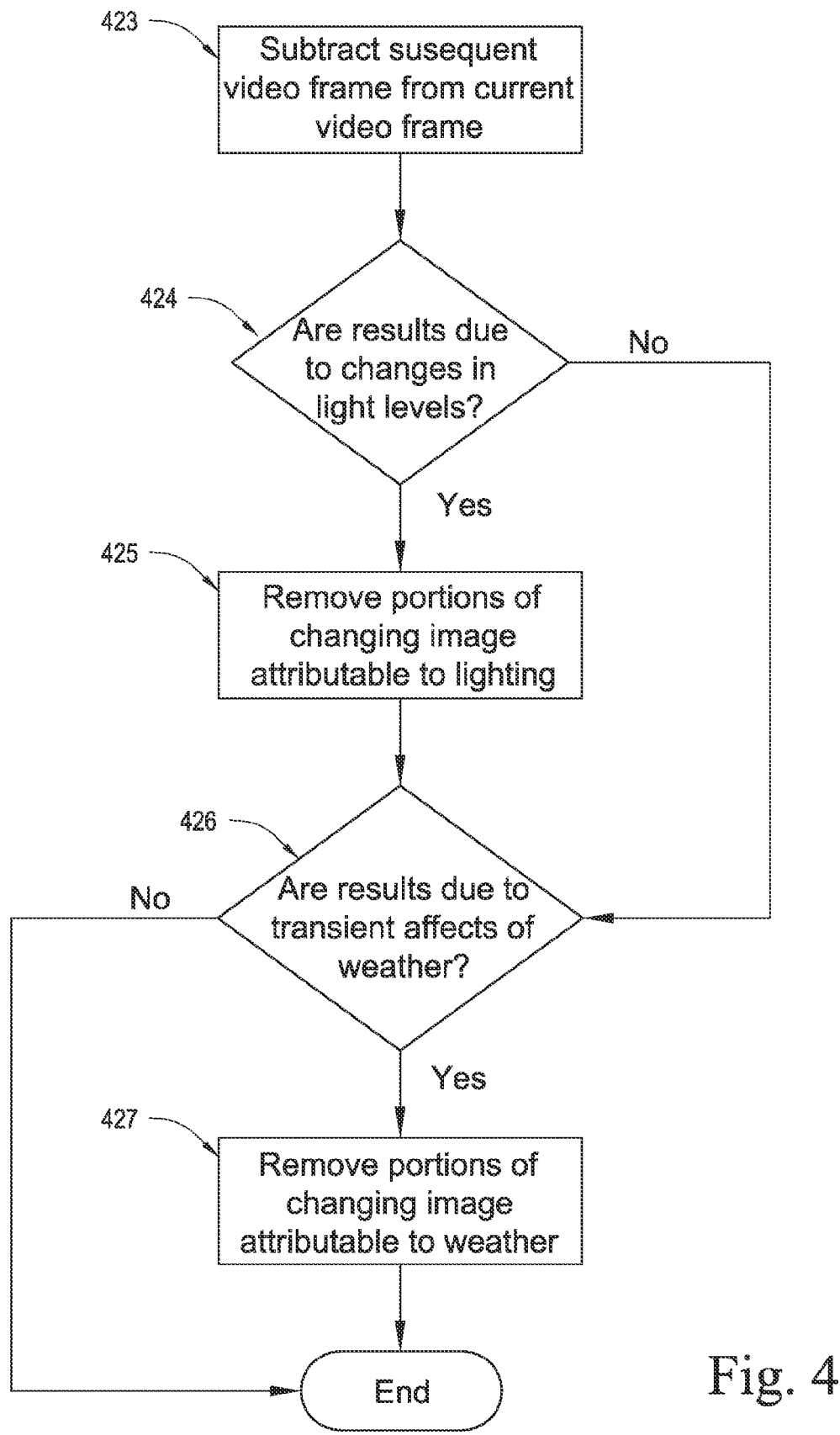

FIG. 4 depicts a possible embodiment of the rules applied to the data to detect an unchanging image. At least part of the rules may define detecting a known object in the subsequent video frame as described herein. A subsequent video frame may be captured and a current video frame may be captured. The current video frame and the subsequent video frame may be compared and data that is not identical between the two of them may be characterized as background data at 423. A subsequent background in the subsequent video frame and a current background in the current video frame may be defined by detecting an unchanging image. Unchanging data in the current video frame may be termed the current background. Unchanging data in the subsequent video frame may be termed subsequent background. Data that differs between the subsequent video frame and the current video frame may represent a changing image. However, not all data contained in the changing image may represent an anomaly to which it is desirable for the lighting device to respond. A rule may be applied to the changing image to determine if that change represents an anomaly. An anomaly may be detected between the subsequent background and the current background indicating that the known object appears in either the subsequent video frame of the current video frame. The rules may generate an output responsive to the detection of the anomaly. The output may be storable in memory.

As an example, and not as a limitation, a rule may be applied to the changing image to determine if the differences between the two frames are due to changes in lighting at 424. If the changes are due to variations in lighting, the data that was classified as part of the changing image due to the lighting variations may be removed from classification as the changing image at 425. As another example, and not as a limitation, a rule may be applied to determine if data has changed as a result of transient effects of the weather or other environmental factors, for example, but not as a means of limitation, rain, wind, or the like. Changes of this nature may not represent an anomaly to which it is desirable for the lighting device to respond. As another example, and not as a limitation, a rule may be applied to the changing image to determine if the differences between the two frames are due to changes in environmental factors at 426. If the changes are due to environmental factors, the data that was classified as part of the changing image due to the environmental factors may be removed from classification as the changing image at 427. The rules may utilize data that remains classified as the changing image to define or identify the object detected by the lighting device.

Data that is the same between the current video frame and the subsequent video frame may be called the unchanging image. It can be understood by one skilled in the art that more than two video frames may be used to determine the unchanging image. That is, the data from two or more video frames may be analyzed to determine what information stays constant from frame to frame. To determine what data is the same or what data should be considered the unchanging image, the video frames may be analyzed to determine what changes are significant, and may give rise to the occurrence of an event, and what changes are of a nature that should not be considered the occurrence of an event. The unchanging image may encompass more data than the unchanging data. The unchanging image may also include data that has changed, but the change is not remarkable or significant enough to cause the device to detect an event.

Figure 5:
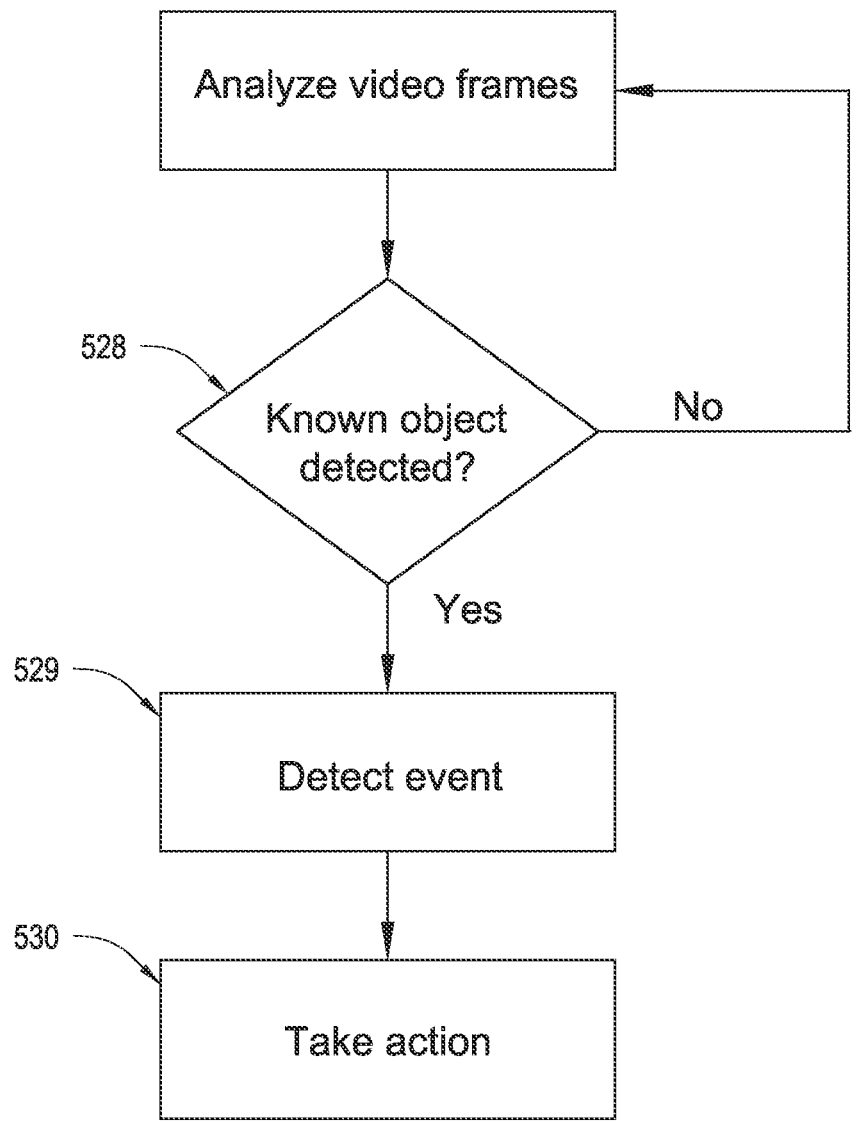

FIG. 5 depicts a rule regarding how the lighting device may respond when a known object is detected. The rule may operate to cause the device to continuously or repeatedly analyze frames until a known object is detected at 528. The detection of the known object may result in a detection of an event at 529. An event may be defined in the rules to relate to the condition being detected in the environment. The event may be associated with an action. The action may occur subsequent to detecting the event at 530. The device may analyze frames until a known object is detected by the rules. The detection of this known object may result in an event being recognized. The event may be associated with an action, for example actuation of a light source. Therefore, upon detection of a known object, the device may actuate the light source. In another embodiment, the rules may detect that a known object has disappeared from the video frame, or is no longer detectable. The disappearance of a known object may result in an event being recognized. The event may be associated with an action, for example, extinguishing the light source. Therefore, upon detection of the absence of a known object, the device may extinguish the light source. One skilled in the art will recognize that the aforementioned examples are presented for clarification and are not limiting.

The action that is associated with an event may include generating an alert. The alert may include actuating a light source that is operable between an on position and an off position (also referred to as an on state and an off state). The skilled artisan will appreciate that the light source may be operated between the on state and the off state, i.e., dimming the light source. When the alert is generated, the lighting device may be actuated, when the alert is not generated, the lighting device may not be actuated. Conversely, the lighting device may be actuated when an alert is not generated. The alert or action may include actuating an audible alarm, actuating a light source that is operable between variable luminosities, or the like. In embodiments that include variable light sources, different events may be associated with controlling the light source to emit different luminosity levels. One skilled in the art will recognize that the aforementioned examples are presented for clarification and are not limitations.

In one embodiment of the invention, the output of the rules engine may indicate whether or not an event occurred. The output of the analysis may be displayed by the interface. In an alternate embodiment of the invention, there may be a plurality of outputs from the rules engine. The plurality of outputs may indicate the occurrence of separate, specific events. The plurality of outputs may be displayed, presented, or accessible to the user through the interface.

In one embodiment of the invention, a rule may be defined so that that an event occurs if the subsequent video frame differs from the current video frame by more than a threshold level. In an embodiment of the present invention in which the video frame is a still image captured by a video camera, the rule may recognize the occurrence of an event if more than a certain number or a certain percentage of pixels change from one video frame to another.

In a preferred embodiment of the invention, an anomaly may be detected when a known object appears in a video frame. The detection of this anomaly may generate an output of the microcontroller. This output may be stored in a memory. Anomalies may also be detected when a known object disappears from a video frame, when a known object fails to appear in a video frame at a given time, when a known object remains in the video frame longer than expected, when any object is detected by the device, when any object disappears from the video frame, or the like.

In a preferred embodiment of the invention, the rules engine may generate an output indicating the presence of the known object only when the known object is located as a specific location in the environment. That is, the rules engine may identify the known object, but the output of the rules engine will depend upon the location at which the known object was detected. In one embodiment, the output of the rules engine may depend upon detection of the known object at a plurality of locations. That is, the known object may trigger the output to be activated only when the known object is in one of a plurality of locations. Additionally, a plurality of known objects may trigger the output to be activated only when the plurality of known objects are located at a plurality of locations in the environment. The known object may trigger the output to be activated only when the known object is not in one of a plurality of locations.

The lighting device according to an embodiment of the present invention may be connected to a network. The network may be a closed network in which only elements of the lighting device are in communication with the network. An example, but not a limitation, of a closed network is a device with a plurality of sensors transmitting data over the network to a single microcontroller. Alternatively, the network may allow the lighting device to connect to components external to the device itself. Examples of external components that may connect to the device through a network include, but are not limited to, remote computers, cellular phones, handheld devices, and the like. The device may utilize a network to connect to the Internet. In embodiments in which the device is connected to the Internet or to other components that may allow users to interact with the device, users may use these components to access device data through the network. Additionally, users may access the results of the analysis through the network. Different elements of the device may be connected to the network. Elements that may be connected to the network include the plurality of sensors 101, the microcontroller 103, the processor 104, the memory 105, the light source 109, the rules engine 106, the interface 132, the centralized computing device, and any other element of the lighting device 100.

In one embodiment, the interface 132 may be connected to the network to allow remote viewing of the overview. In another embodiment of the device, the plurality of sensors 101 may be connected to the network to allow remote viewing of the data. In yet another embodiment of the device, the microcontroller 103 may be connected to the network to allow modification of the rules. One skilled in the art will recognize that the preceding are merely exemplary network configurations. The examples listed are not exhaustive and are not provided as a limitation on possible network configurations.

In an embodiment of the device 100 according to the present invention in which the device is in communication with a network, a network interface may be employed to interface with the network. A person of skill in the art will appreciate that the network interface may be included within the microcontroller 103 discussed above. Alternately, a skilled artisan will appreciate that the network interface may be operatively connected to the microcontroller 103, wherein it may operate as an interface device between the microcontroller 103 and a connected network, such as for example, a home network, corporate network, or the Internet.

The network interface may provide a channel for the electronic communication of data between the lighting device 100 and a connected component connected through the network. Provided without the intent to be limiting, examples of network connected components may include additional lighting devices 100, personal computers, tablets, smartphones, personal data assistants, a data center, remote, key fob, a light switch, or other electronic devices capable of connecting to a network.

The network interface may connect to a network using a proprietary or standard connection protocol. With respect to embodiments of the present invention that include a proprietary network connection, the network interface may perform handshake operations and exchange data with network connected devices, as may be defined within the proprietary protocol. Alternately, the network interface may connect to a network using a standardized protocol. Examples of standardized protocols, provided without the intent to be limiting, may include 802.3 Ethernet, 802.11 Wi-Fi, 802.15.1 Bluetooth, 802.15.4 low rate personal area network 62 (PAN) environments, packet switching wide area networks (WAN), cellular relay WANs, or additional standardized data transmission protocols.

The lighting device 100 according to an embodiment of the present invention may include a plurality of sensors 101. These sensors 101 may be connected to a network. The plurality of sensors 101 may be located in a plurality of locations in the environment 102. Each of the plurality of sensors 101 may intercommunicate with the microcontroller 103 through the network. The plurality of sensors 101 may each have a network interface through which it accesses the network. The plurality of sensors 101 may all share a network through which they intercommunicate with the microcontroller 103. Alternatively, each of the plurality of sensors 101 may intercommunicate with the microcontroller 103 through a network to which fewer than all of the plurality of sensors 101 may be in communication.

The plurality of sensors 101 of the lighting device 100 according to an embodiment of the present invention may be connected to a network and a centralized computing device may also be connected to the network. The centralized computing device may include the microcontroller 103. The data from the sensors 101 may be transmitted electronically over the network to the centralized computing device.

Alternatively, in embodiments of the present invention wherein a centralized computing device is utilized, the plurality of sensors 101 may be coupled to the microcontroller 103 and the data from the plurality of sensors 101 may be transmitted to the microcontroller 103. The microcontroller 103 may be in communication with the centralized computing device through the network. The microcontroller 103, the centralized computing device, or any combination of the two may analyze the data received from the plurality of sensors 101. The microcontroller 103 may be referred to as a central processor in embodiments of the present invention wherein the microcontroller is located in the centralized computing device. The memory 105 may be referred to as central memory in embodiments of the present invention wherein the memory is located in the centralized computing device. The centralized computing device may receive data from a plurality of sensors 101. The sensors 101 may be in communication with the network, which communicates with the centralized computing device through a central network interface. Additionally, the centralized computing device may operate or contain at least part of the rules engine 106. The results of the analysis performed by the centralized computing device may be accessible using the interface 132.

Figure 6:
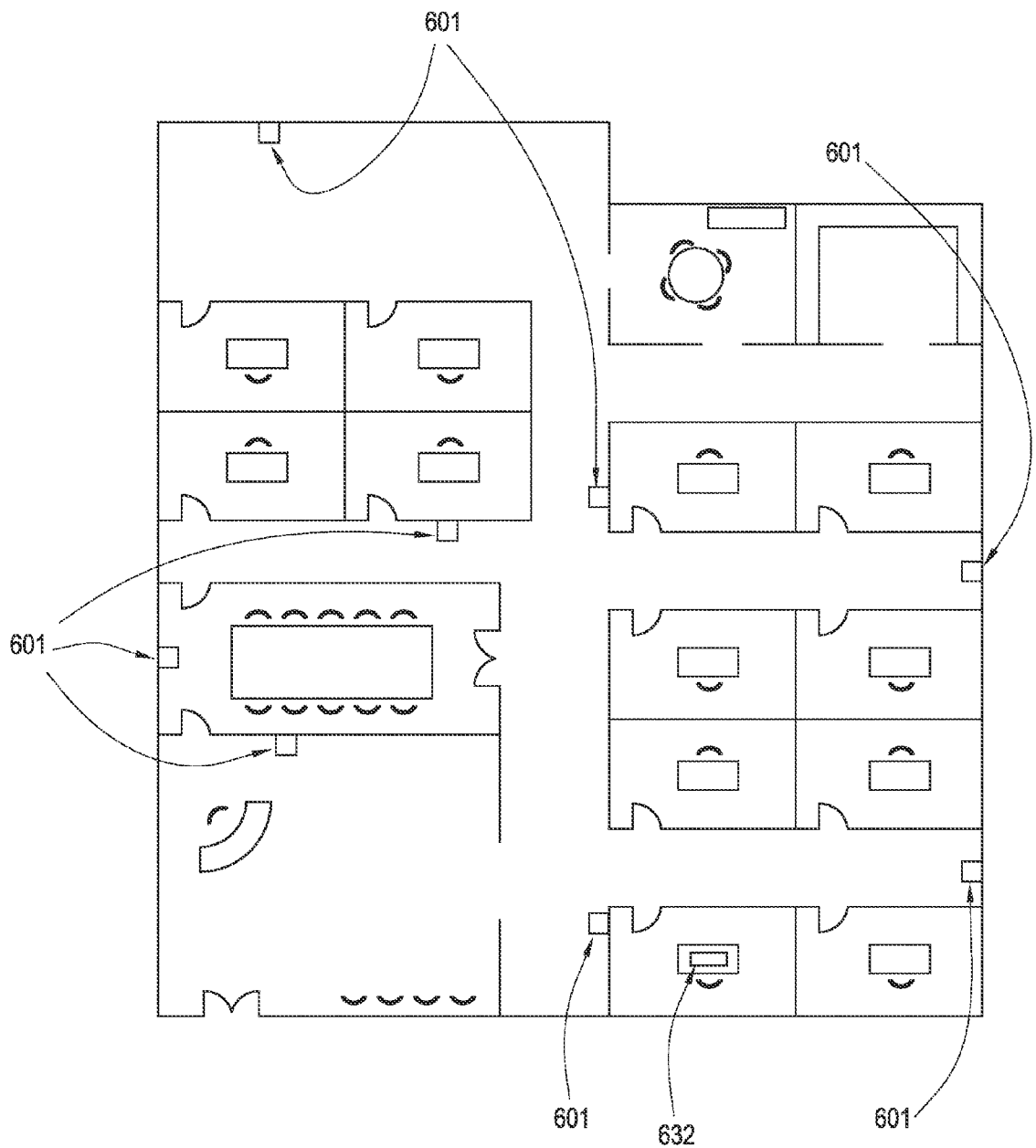
FIG. 6 is an environmental schematic view of a lighting device according to an embodiment of the present invention positioned within a structure.

In embodiments of the present invention wherein a centralized computing device is utilized, the centralized computing device may undergo an initialization operation. The initialization operation may be performed when the device is initially powered on or when the device is configured. Additionally, the initialization operation may be performed periodically or intermittently during the operation of the device 100. The initialization operation may detect each of the plurality of sensors 101 at each of the plurality of locations in the environment 102. The initialization operation may be performed automatically or manually. The initialization operation may be used to define at least part of the rules 107 relative to the location in the environment 102 that includes the sensor 101. FIG. 6 depicts an embodiment in which there may be a plurality of sensors 601. The plurality of sensors 601 may be positioned at a plurality of locations in the environment. The plurality of sensors 601 may be located remotely from the other elements of the device. Each of the plurality of sensors may transmit data to a plurality of microprocessors. The plurality of microprocessors may concatenate the data to produce a single overview containing data from each of the plurality of sensors

601. In embodiments of the present invention in which the data is moving images, the data may be concatenated to produce a single image that includes data received from each of the plurality of sensors. The results of the analysis performed by the rules engine may be included in the overview.

FIG. 6 depicts one scenario in which concatenation of images into an overview may be utilized. Each of the plurality of sensors 601 shown in FIG. 6 may capture an image of a location in the environment. The location in the environment may be different for each of the plurality of sensors. Each of the plurality of sensors 601 may transmit data to the microcontroller. The microcontroller may use the data along with information that may be stored in memory to indicate the position of each of the plurality of sensors in order to concatenate the data into a single image containing information from more than one of the plurality of sensors. The single image may be an overview. The result may be that a user can utilize the overview to gain information about conditions in the environment. In the absence of an overview, a user may have multiple images to review on the interface 132. When an overview is used, the user may be able to refer to a single overview that incorporates the multiple data feeds into a single unified view of the environment. The overview may display the video frames captured from the plurality of locations substantially seamlessly with respect to the location in which the sensor is positioned. The overview may be viewed using the interface 132. The use of video data to create an overview is exemplary and not limiting. Those skilled in the art will appreciate that many different kinds of data from a plurality of sensors may be concatenated to create an overview.

The concatenated data used to create an overview may be dissimilar data. That is, the plurality of sensors may transmit different types of data to the microcontroller. As an example, and not as a limitation, a device may have a sensor that captures video data and another sensor that captures infrared data. The overview may contain both the video data and the overlaid infrared data in a single view. One of the advantages of creating an overview of dissimilar data may be that a single device can provide the interface 132 with data that is useful under many different environmental conditions.

The overview may be output to the interface. The interface may be physically located remotely from the other elements of the device 100. Each sensor 601 may capture video frames from a plurality of locations in the environment. In the embodiment depicted in FIG. 6, each sensor 601 may transmit the data collected by the individual sensor 601 to a shared interface 632 that collects data from each of the sensors 601. This shared interface 632 may display data received from each sensor 601. The data may be accessible through the interface 632.

In an embodiment in which a plurality of locations are included in the environment, the rules may analyze the data and generate results based on the location in which the sensor capturing the video frame is located. Events detected by a sensor in location A may create different results than event detected by a sensor in location B. For example, but not by way of limitation, analysis of video frames transmitted by a sensor 601 at location A in the environment may indicate the presence of an object at location A. Analysis of video frames transmitted by a sensor 601 at location B in the environment may indicate the presence of the same object at location B. The rules may generate a different result for the detection of the object at location A than they generate for the detection of the object at location B.

In an embodiment of the present invention in which a plurality of sensors are positioned in a plurality of locations in the environment, the plurality of sensors may be position at locations throughout the environment in an approximately uniform manner. Positioning the plurality of sensors in an approximately uniform manner may include positioning each of the plurality of sensors approximately the same distance apart from one another, positioning each of the plurality of sensors at approximately the same height from the ground, positioning each of the plurality of sensors with approximately the same viewing angle with respect to the horizon, or the like. Video frames may be captured by a plurality of sensors in a plurality of locations in an approximately uniform manner. Capturing video frames in an approximately uniform manner may include capturing video frames at approximately the same intervals, capturing video frames at approximately the same time, capturing video frames at approximately the same frequency, or the like. The video frames may be concatenated to create an overview that includes substantially all of the location in the environment substantially seamlessly. The uniform distribution of sensors and the uniform capture of video frames may assist in creating a substantially seamless overview of the locations in the environment that are captured by the sensors.

Figure 7:
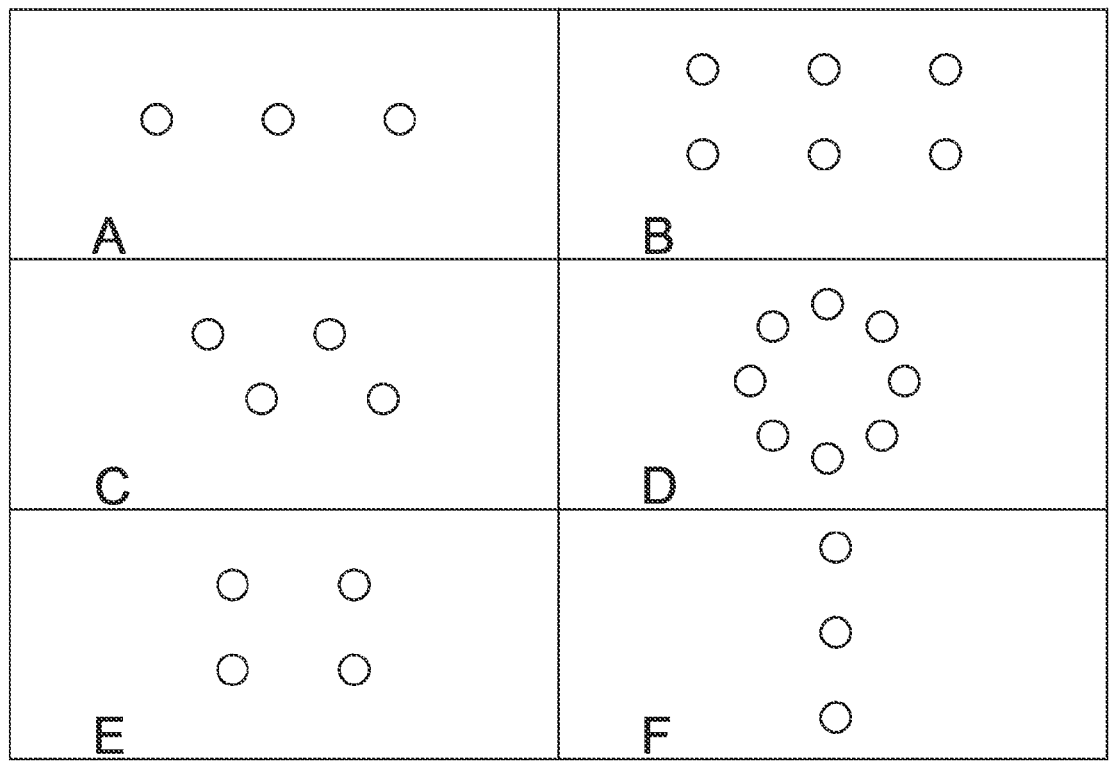
FIG. 7 is a schematic depiction of a grid configuration of sensors of a lighting device according to an embodiment of the present invention.

In an embodiment a the present invention in which a plurality of sensors are positioned at approximately uniform locations, the locations throughout the environment may be configured relating to an approximately grid based pattern. The plurality of sensors may be positioned at the approximately grid-based locations to capture video frames relative to the approximately grid based pattern. FIG. 7 depicts possible grid patterns.

Figure 8:
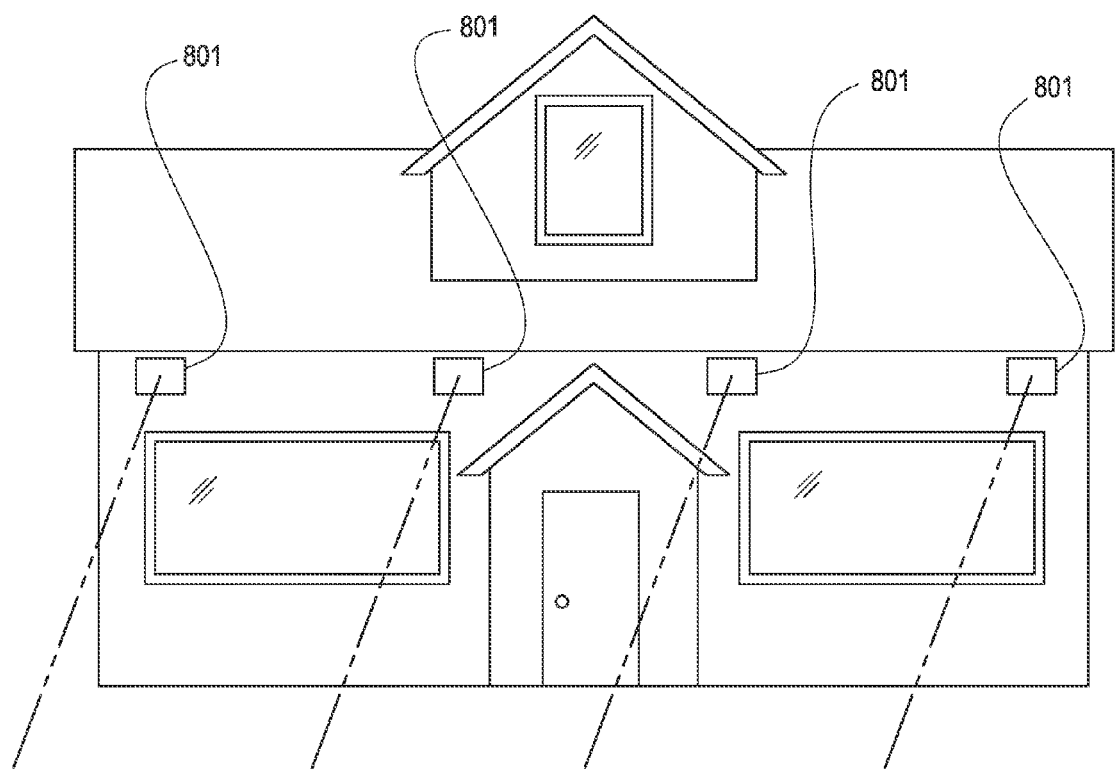
FIG. 8 is a depiction of an alternate configuration of sensors of a lighting device according to an embodiment of the present invention.

FIG. 8 depicts one embodiment of the present invention with a plurality of sensors 801. In embodiments of the present invention in which a plurality of sensors 801 are positioned at uniform locations, the plurality of sensors 801 may be positioned to capture video frames from the environment using similar viewing angles relative to the environment. FIG. 8 depicts a plurality of sensors 801 with similar viewing angles relative to the environment.

Figure 9:
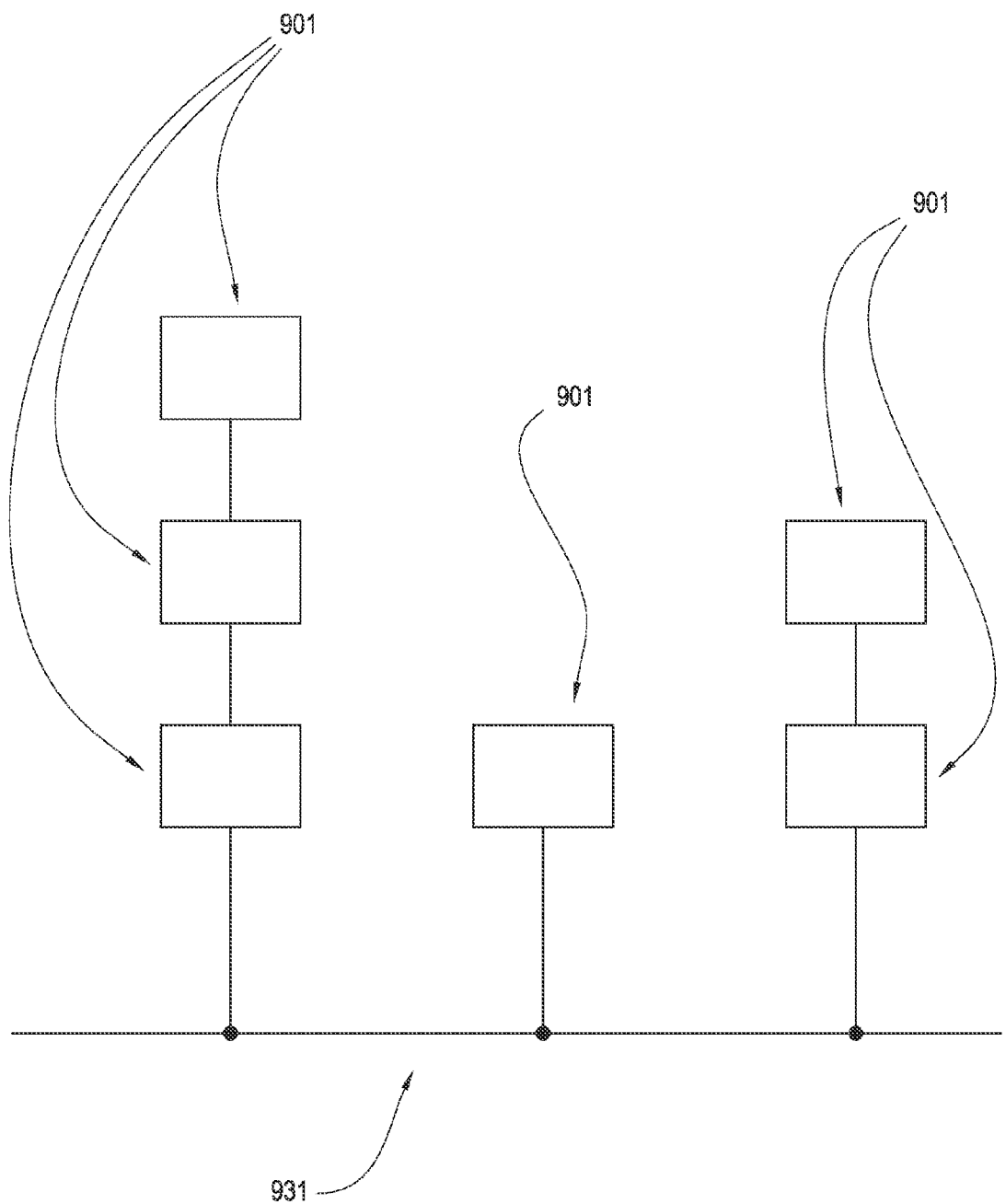
FIG. 9 is a depiction of a mesh network as used in connection with a lighting device according to an embodiment of the present invention.

In an embodiment of the lighting device according to the present invention wherein there are a plurality of sensors, the plurality of sensors may intercommunicate through the network using mesh networking. FIG. 9 depicts as an example, but not as a limitation, one possible configuration of sensors 901 in a mesh network. As shown in FIG. 9, not each of the plurality of sensors 901 must be directly connected to the network 931. A plurality of the plurality of sensors 901 may serve as a relay for another sensor, or other sensors, that are not directly connected to the network 931. A person of skill in the art will appreciate that the configuration of nodes illustrated in FIG. 9 has been chosen in the interest of clarity, as the nodes may be configured in a plethora of additional locations relative to one another.

In one embodiment of the lighting device, compressible video frame data may be received by the microcontroller. The microcontroller may perform a compression algorithm on the video frame data resulting in a compressed video frame that has a reduced data size. The compressed video frame may then be transmitted through the network.

In one embodiment of the invention, the sensor may capture a plurality of video frames. These video frames may be concatenated together to form a video feed. The video feed may be transmitted to and accessible using the interface 132. In this embodiment, the interface 132 may be a monitor or the like. The results of the analysis performed by the rules engine may also be included in the video feed and accessible using the interface 132.

In embodiments of the present invention that utilize a plurality of sensors in a plurality of locations, a video feed may be received from the plurality of locations. The video feed received from each of the plurality of locations may be concatenated to create a video overview. The video overview may be accessible using the interface 132. Additionally, the results of the analysis performed by the rules engine may be included in the concatenated video overview. The results may also be accessible using the interface 132.

In embodiments of the present invention in which there are a plurality of sensors and the data from each sensor is concatenated, the rules may be applied to the data received from each of the plurality of sensors before or after it is concatenated with data received from others of the plurality of sensors.

In embodiments wherein the overview is viewable using the interface 132, a portion of the overview may be viewable as a field of view. A wide field of view may include substantially all locations captured by the plurality of sensors. A narrow field of view may include the location captured by a single sensor or some location less than all locations captured by the plurality of sensors. The field of view viewable using the interface 132 may be scalable between the wide field of view and the narrow field of view.

In one embodiment of the invention, supplemental data may be viewable using the interface 132. By way of example, but not as a limitation, supplemental data may include information regarding whether an event was detected or what known objects have been identified. Additionally, supplemental data may include information regarding the time an object was detected or the location in which an object was detected. Supplemental data may be information regarding what events have occurred within a given amount of time, what events trigger actions, what known objects are recognized by the lighting device, or the like. In embodiments utilizing a network, supplemental data may be accessible through the network. The supplemental data may be included with the overview substantially seamlessly. Additionally, the supplemental data may be included with the video overview substantially seamlessly.

In one embodiment of the lighting device according to the present invention, at least a part of the plurality of sensors may be positioned to detect objects from different angles. By combining the video frames captured from these at least a part of the plurality of sensors, a stereoscopic perspective of the object may be created. The parallax between the video frames obtained from at least a part of the plurality of sensors may be used to calculate depth in a three-dimensional space and determine the position of the object detected by the sensors. In one embodiment of the device according to the present invention, the sensor, microcontroller, and interface 132 may be included in a luminaire.

In one embodiment of the inventive method according to the present invention, the occupancy of an environment may be detected. The occupancy of an environment may indicate whether or not humans, or other objects occupy the environment. Additionally, the occupancy of an environment may indicate whether or not the environment is occupied by moving objects, known objects, unknown objects, or the like. The method of detecting occupancy may include capturing video frames from a location in the environment. The video frames may be transmittable as data. The data contained in the video frames may be compared to rules using a rules engine that is operable by the microcontroller. Comparing the data to rules may produce results indicative of a condition of the environment. The data may be analyzed by detecting a precedent video frame, detecting a subsequent video frame, and comparing the precedent video frame with the subsequent video frame to detect a likelihood of disparity between the video frames. The results of the analysis may be generated respective to the likelihood of disparity between the video frames and these results may be stored in memory. The video frames may be captured from a plurality of locations and the video frames at each of the plurality of locations may be concatenated to create an overview. The video frames captured from the plurality of locations may be displayed substantially seamlessly with respect to the location in which the sensor capturing the video frame is positioned. The overview may be viewable using an interface 132. Access to the results of the analysis may be provided using the interface 132 and the results of the analysis may be included in the overview.

The data transmitted by the plurality of sensors may be received on a centralized computing device. The centralized computing device may be initialized to detect one of the pluralities of sensors at each of the plurality of location in the environment. The centralized computing device may be initialized to define at least part of the rules relative to the locations in the environment that includes the sensor.

Each of the plurality of sensors may be positioned at locations throughout the environment in an approximately uniform manner. The video frames may be captured in the locations in an approximately uniform manner. The video frames may be concatenated to create the overview that includes substantially all of the locations in the environment substantially seamlessly.

The locations in the environment may be configured relating to an approximately grid based pattern. The sensors may be positioned at the locations in the environment to capture the video frames relative to the approximately grid based pattern. The sensors may be positioned to capture the video frames from the environment using similar viewing angles relative to the environment.

A person of skill in the art will appreciate that one or more of the above provided embodiments may be included in the operation of the lighting device of the present invention. Additionally, a person of skill in the art will appreciate additional embodiments that would be included within the scope and spirit of the present invention, after having the benefit of this disclosure. Furthermore, a skilled artisan will appreciate that the operations described above, along with additional operations that would be apparent to those in the art, may be performed exclusively, incrementally, sequentially, simultaneously, or any other operative configuration.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A device to detect occupancy of an environment, the device comprising:
   a sensor to capture images from a location in the environment, the images being transmittable as data;
   rules comparable with the data using a rules engine operable by a microcontroller with a processor and memory to produce results indicative of a condition of the environment, the rules being included in the memory; and an interface through which the data is accessible;

wherein at least part of the rules define an analysis of the data including:

detecting a precedent image, detecting a subsequent image, comparing the precedent image with the subsequent image to detect a likelihood of disparity between the images, creating a detected object image based on the disparity between the images, comparing the detected object image to known image data acquired from one or more known physical objects to detect a likelihood of similarity between the images, generating the results of the analysis respective to the likelihood of similarity, and generating the results of the analysis respective to the likelihood of disparity, the results being storable in the memory;

wherein the results are generated respective to the location in the environment;

wherein a plurality of locations are includable in the environment;

wherein the microcontroller is in communication with a network using a network interface;

wherein a plurality of sensors are locatable in the plurality of locations and are adapted to intercommunicate with the microcontroller through the network;

wherein the images captured at each of the plurality of locations are concatenated to create an overview;

wherein the overview displays the images captured from the plurality of locations substantially seamlessly respective to the location in which the sensor is positioned, the overview being viewable using the interface;

wherein the results of the analysis performed by the rules engine are accessible using the interface;

wherein the results of the analysis are includable in the overview; and wherein the one or more known physical objects are definable in the rules by placing the one or more known physical objects in the location in the environment and capturing the known image data of the one or more known physical objects using at least one of the plurality of sensors.

2. A device according to claim 1 further comprising a centralized computing device to receive data from the plurality of sensors and operate at least part of the rules engine; wherein the centralized computing device includes a central processor, central memory, and a central network interface to be in communication with the sensors through the network; wherein the results of the analysis performed by the centralized computing device are accessible using the interface.

3. A device according to claim 2 wherein the centralized computing device undergoes an initialization operation to detect the sensor at each of the plurality of locations in the environment and to define at least part of the rules relative to the locations in the environment that includes the sensor.

4. A device according to claim 3 wherein the sensor is coupled to the microcontroller; and wherein the microcontroller is in communication with the centralized computing device though the network to analyze the data received by the sensor.

5. A device according to claim 1 wherein each of the plurality of sensors are positioned at locations throughout the environment in an approximately uniform manner; wherein the images are captured by the sensors in the locations in an approximately uniform manner; and wherein the images are concatenated to create the overview that includes substantially all of the locations in the environment substantially seamlessly.

6. A device according to claim 5 wherein the locations throughout the environment are configured relating to an approximately grid based pattern; and wherein the sensors are positionable at the locations to capture the images relative to the approximately grid based pattern.

7. A device according to claim 5 wherein the sensors are positioned to capture the images from the environment using similar viewing angles relative to the environment.

8. A device according to claim 1 wherein a high likelihood of disparity detected in the location is indicative of occupancy of the location; and wherein a low likelihood of disparity in the location is indicative of no occupancy of the location.

9. A device according to claim 1 wherein the plurality of sensors intercommunicate though the network using mesh networking.

10. A device according to claim 1 wherein the sensor includes a camera.

11. A device according to claim 10 wherein the image is a video frame captured by the camera.

12. A device according to claim 1 wherein an event is definable in the rules to relate to the condition being detected in the environment; wherein the event is associable with an action; and wherein the action may occur subsequent to detecting the event.

13. A device according to claim 12 wherein the action includes generating an alert.

14. A device according to claim 1 wherein each of the images are compressible by the microcontroller; and wherein the images that are compressed are transmitted through the network.

15. A device according to claim 1 wherein the images are concatenated to create a video feed; and wherein the video feed is accessible using the interface.

16. A device according to claim 1 wherein an image is receivable from the plurality of locations; wherein the image received from each of the plurality of locations is concatenated to create a video overview; and wherein the video overview is accessible using the interface.

17. A device according to claim 16 wherein the results of the analysis performed by the rules engine at each of the locations is included in the video overview and accessible using the interface.

18. A device according to claim 1 wherein a portion of the overview is viewable using the interface as a field of view; wherein a wide field of view includes substantially all locations; wherein a narrow field of view includes one location; wherein the field of view is scalable between the wide field of view and the narrow field of view.

19. A device according to claim 1 wherein supplemental data is viewable using the interface, the supplemental data being accessible through the network.

20. A device according to claim 19 wherein the supplemental data is included with the overview substantially seamlessly.

21. A device according to claim 1 wherein the condition in the environment is motion.

22. A device according to claim 1 wherein an object occupying at least part of the environment is detectable by the sensor.

23. A device according to claim 1 wherein the object is detectable by at least part of the plurality of sensors to create a stereoscopic perspective; and wherein a parallax among the images in the stereoscopic perspective is used to calculate depth in a three-dimensional space.

24. A device according to claim 1 wherein the sensor, the microcontroller and the interface are includable in a luminaire.

25. A device to detect occupancy of an environment, the device comprising:
a plurality of sensors that include a camera and that are locatable to capture video frames from a plurality of locations in the environment that are being transmittable as data;
rules comparable with the data using a rules engine operable by a microcontroller with a processor and memory to produce results indicative of a condition of the environment, the rules being included in the memory; and
an interface through which the data is accessible;
wherein at least part of the rules define an analysis of the data including:
detecting a precedent video frame,
detecting a subsequent video frame,
comparing the precedent video frame with the subsequent video frame to detect a likelihood of disparity between the video frames,
creating a detected object image based on the disparity between the video frames,
comparing the detected object image to known image data acquired from one or more known physical objects to detect a likelihood of similarity between the images,
generating the results of the analysis respective to the likelihood of similarity, and
generating the results of the analysis respective to the likelihood of disparity, the results being storable in the memory;
wherein the results are generated respective to the location in the environment;
wherein a plurality of locations are includable in the environment;
wherein the microcontroller is in communication with a network using a network interface;
wherein a plurality of sensors are locatable in the plurality of locations and are adapted to intercommunicate with the microcontroller through the network;
wherein the video frames captured at each of the plurality of locations are concatenated to create an overview;
wherein the overview displays the video frames captured from the plurality of locations substantially seamlessly respective to the location in which the sensor is positioned, the overview being viewable using the interface;
wherein each of the video frames are compressible by the microcontroller to be transmittable through the network;
wherein the object is detectable by at least part of the plurality of sensors to create a stereoscopic perspective; and
wherein the one or more known physical objects are definable in the rules by placing the one or more known physical objects in the location in the environment and capturing the known image data of the one or more known physical objects using at least one of the plurality of sensors.

26. A device according to claim 25 further comprising a centralized computing device to receive data from the plurality of sensors and operate at least part of the rules engine; wherein the centralized computing device includes a central processor, central memory, and a central network interface to be in communication with the sensors through the network; wherein the results of the analysis performed by the centralized computing device are accessible using the interface.

27. A device according to claim 26 wherein the centralized computing device undergoes an initialization operation to detect the sensor at each of the plurality of locations in the environment and to define at least part of the rules relative to the locations in the environment that includes the sensor.

28. A device according to claim 27 wherein the sensor is coupled to the microcontroller; and wherein the microcontroller is in communication with the centralized computing device though the network to analyze the data received by the sensor.

29. A device according to claim 25 wherein each of the plurality of sensors are positioned at locations throughout the environment in an approximately uniform manner; wherein the video frames are captured by the sensors in the locations in an approximately uniform manner; and wherein the video frames are concatenated to create the overview that includes substantially all of the locations in the environment substantially seamlessly.

30. A device according to claim 29 wherein the locations throughout the environment are configured relating to an approximately grid based pattern; and wherein the sensors are positionable at the locations to capture the video frames relative to the approximately grid based pattern.

31. A device according to claim 29 wherein the sensors are positioned to capture the video frames from the environment using similar viewing angles relative to the environment.

32. A device according to claim 25 wherein a high likelihood of disparity detected in the location is indicative of occupancy of the location; and wherein a low likelihood of disparity in the location is indicative of no occupancy of the location.

33. A device according to claim 25 wherein the plurality of sensors intercommunicate though the network using mesh networking.

34. A device according to claim 25 wherein an event is definable in the rules to relate to the condition being detected in the environment; wherein the event is associable with an action; wherein the action may occur subsequent to detecting the event; and wherein the action includes generating an alert.

35. A device according to claim 25 wherein a video feed is receivable from the plurality of locations; wherein the video feed received from each of the plurality of locations is concatenated to create a video overview; and wherein the video overview is accessible using the interface.

36. A device according to claim 35 wherein the results of the analysis performed by the rules engine at each of the locations is included in the video overview and accessible using the interface.

37. A device according to claim 25 wherein a portion of the overview is viewable using the interface as a field of view; wherein a wide field of view includes substantially all locations; wherein a narrow field of view includes less than all locations; wherein the field of view is scalable between the wide field of view and the narrow field of view.

38. A device according to claim 25 wherein supplemental data is viewable using the interface, the supplemental data being accessible through the network; and wherein the supplemental data is included with the overview substantially seamlessly.

39. A device according to claim 25 wherein the condition in the environment is motion; and wherein an object occupying at least part of the environment is detectable by the sensor.

40. A device according to claim 25 wherein a parallax among the video frames in the stereoscopic perspective is used to calculate depth in a three-dimensional space.

41. A device according to claim 25 wherein the results of the analysis performed by the rules engine are includable in the overview and are accessible using the interface.

42. A device according to claim 25 wherein the sensor, the microcontroller and the interface are includable in a luminaire.

43. A method of detecting occupancy of an environment, the method comprising:
capturing video frames from a location in the environment sensors, the video frames being transmittable as data;
comparing the data to rules using a rules engine operable by a microcontroller with a processor and memory to produce results indicative of a condition of the environment;
analyzing the data by:
detecting a precedent video frame,
detecting a subsequent video frame,
comparing the precedent video frame with the subsequent video frame to detect a likelihood of disparity between the video frames,
creating a detected object image based on the disparity between the video frames,
comparing the detected object image to known image data acquired from one or more known physical objects to detect a likelihood of similarity between the images,
generating the results of the analysis respective to the likelihood of similarity, and
generating the results of the analysis respective to the likelihood of disparity, the results being storable in the memory;
concatenating the video frames captured at each of the plurality of locations to create an overview;
displaying the video frames captured from the plurality of locations substantially seamlessly respective to the location in which the sensors are positioned, the overview being viewable using an interface;
providing access to the results of the analysis using the interface; and
including the results of the analysis in the overview;
wherein the one or more known physical objects are definable in the rules by placing the one or more known physical objects in the location in the environment and capturing the known image data of the one or more known physical objects using at least one of the plurality of sensors.

44. A method according to claim 43 further comprising receiving data from the sensors on a centralized computing device; initializing the centralized computing device to detect the sensors at each of the plurality of locations in the environment and to define at least part of the rules relative to the locations in the environment that includes the sensor.

45. A method according to claim 43 further comprising positioning each of the sensors at locations throughout the environment in an approximately uniform manner; capturing the video frames in the locations in an approximately uniform manner; and concatenating the video frames to create the overview that includes substantially all of the locations in the environment substantially seamlessly.

46. A method according to claim 45 further comprising configuring the locations throughout the environment relating to an approximately grid based pattern; and positioning the sensors at the locations to capture the video frames relative to the approximately grid based pattern.

47. A method according to claim 45 further comprising positioning the sensors to capture the video frames from the environment using similar viewing angles relative to the environment.

48. A method according to claim 43 wherein a high likelihood of disparity detected in the location is indicative of occupancy of the location; and wherein a low likelihood of disparity in the location is indicative of no occupancy of the location.

49. A method according to claim 43 wherein the sensor includes a camera.

50. A method according to claim 43 further comprising defining an event in the rules to relate to the condition being detected in the environment; wherein the event is associable with an action; wherein the action may occur subsequent to detecting the event; and wherein the action includes generating an alert.

51. A method according to claim 43 further comprising compressing each of the video frames; and transmitting the video frames that are compressed through the network.

52. A method according to claim 43 wherein a video feed is receivable from the plurality of locations; wherein the video feed received from each of the plurality of locations is concatenated to create a video overview; and wherein the video overview is accessible using the interface.

53. A method according to claim 52 further comprising including the results of the analysis performed by the rules engine at each of the locations in the video overview to be accessible using the interface.

54. A method according to claim 43 wherein a portion of the overview is viewable using the interface as a field of view; wherein a wide field of view includes substantially all locations; wherein a narrow field of view includes one location; wherein the field of view is scalable between the wide field of view and the narrow field of view.

55. A method according to claim 43 wherein supplemental data is viewable using the interface, the supplemental data being accessible through the network; wherein the supplemental data is included with the overview substantially seamlessly.

56. A method according to claim 43 wherein the object is detectable by at least part of the plurality of sensors to create a stereoscopic perspective; and wherein a parallax among the video frames in the stereoscopic perspective is used to calculate depth in a three-dimensional space.

* * * * *